US010685524B2

(12) United States Patent
Milos-Schouwink et al.

(10) Patent No.: US 10,685,524 B2
(45) Date of Patent: Jun. 16, 2020

(54) METHOD FOR AUTHENTICATING A SECURITY MARKING UTILIZING LONG AFTERGLOW EMISSION, AND SECURITY MARKING COMPRISING ONE OR MORE AFTERGLOW COMPOUND

(71) Applicant: SICPA HOLDING SA, Prilly (CH)

(72) Inventors: Mia Milos-Schouwink, Montreux (CH); Eric Decoux, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/315,996

(22) PCT Filed: Jul. 5, 2017

(86) PCT No.: PCT/EP2017/066772
§ 371 (c)(1),
(2) Date: Jan. 7, 2019

(87) PCT Pub. No.: WO2018/007444
PCT Pub. Date: Jan. 11, 2018

(65) Prior Publication Data
US 2019/0304231 A1    Oct. 3, 2019

(30) Foreign Application Priority Data

Jul. 6, 2016  (EP) .................................. 16178155

(51) Int. Cl.
*G01N 21/64*        (2006.01)
*G07D 7/1205*     (2016.01)
(Continued)

(52) U.S. Cl.
CPC .............. *G07D 7/1205* (2017.05); *G01J 1/16* (2013.01); *G01N 21/64* (2013.01); *G07D 7/003* (2017.05);
(Continued)

(58) Field of Classification Search
CPC ......... G07D 1/1205; G07D 7/003; G01J 1/16; B42D 25/373; B42D 25/378; G01D 2207/00
See application file for complete search history.

(56) References Cited

U.S. PATENT DOCUMENTS 3,412,245 A      11/1968  Halverson
7,030,371 B2 *   4/2006   Vasic ................. G01N 21/6408
                                                        250/271

(Continued)

FOREIGN PATENT DOCUMENTS

DE    202016002731    6/2016
EP         1158459    11/2001
(Continued)

OTHER PUBLICATIONS

Koen Van den Eeckhout et al, Persistent Luminescence in Non-Eu2+-Doped Compounds: A Review Materials 2013, 6, 2789-2818.
(Continued)

*Primary Examiner* — Kiho Kim
(74) *Attorney, Agent, or Firm* — Muncy, Geissler, Olds & Lowe, P.C.

(57) ABSTRACT

The invention relates to a method for authenticating a security marking including at a long afterglow compound capable of emitting long afterglow luminescence light in a given wavelength region, the method allowing to detect a presence and an amount of said long afterglow compound based on comparison of a measured initial intensity value of a spectral component of the emitted light within said wavelength region and associated afterglow time with corresponding reference values representative of a reference amount value of a genuine long afterglow compound. The invention also relates to a reader and system operable to implement the steps of the method.

23 Claims, 6 Drawing Sheets

(51) Int. Cl.
*G07D 7/00* (2016.01)
*G01J 1/16* (2006.01)
*B42D 25/373* (2014.01)
*B42D 25/378* (2014.01)

(52) U.S. Cl.
CPC .......... *B42D 25/373* (2014.10); *B42D 25/378* (2014.10); *G07D 2207/00* (2013.01)

(56) References Cited

U.S. PATENT DOCUMENTS

| | | | |
|---|---|---|---|
| 9,243,169 B2 * | 1/2016 | Lacoste | .................. C09J 7/29 |
| 9,778,201 B2 * | 10/2017 | Lacoste | .................. B42D 25/29 |
| 2010/0102250 A1 | 4/2010 | Li et al. | |
| 2013/0020504 A1 | 1/2013 | Kraemer et al. | |
| 2013/0153789 A1 | 6/2013 | Smith et al. | |
| 2016/0078028 A1 * | 3/2016 | Pawlik | ................ H04N 5/2256 |
| | | | 382/209 |
| 2016/0078265 A1 * | 3/2016 | Pawlik | .................. G07D 7/128 |
| | | | 348/162 |
| 2016/0078307 A1 * | 3/2016 | Pawlik | ............... G06K 9/00577 |
| | | | 235/375 |
| 2016/0078706 A1 * | 3/2016 | Pawlik | .................... G07D 7/12 |
| | | | 348/135 |

FOREIGN PATENT DOCUMENTS

| | | | |
|---|---|---|---|
| EP | 1672568 | | 6/2006 |
| JP | 2015017261 A | * | 1/2015 |
| WO | 2005041180 | | 5/2005 |
| WO | 2005095296 | | 10/2005 |

OTHER PUBLICATIONS

A.R. Mirhabibi et al. Pigment & Resin Technology, vol. 33, No. 4, 2004, 220-225.
International Search Report and Written Opinion issued with respect to application No. PCT/EP2017/066772.
International Preliminary Report on Patentability issued with respect to application No. PCT/EP2017/066772.

* cited by examiner

METHOD FOR AUTHENTICATING A SECURITY MARKING UTILIZING LONG AFTERGLOW EMISSION, AND SECURITY MARKING COMPRISING ONE OR MORE AFTERGLOW COMPOUND

TECHNICAL FIELD

The present invention is in the field of luminescent security markings used for verifying the authenticity of various goods, such as goods of commercial value, security cards, banknotes, tickets etc., and methods for their authentication.

BACKGROUND OF THE INVENTION

Many products of commercial value need to be protected against counterfeiting, forging and copying. To this end, products of high value, such as perfumes or watches, as well as documents of value, such as banknotes, tax stamps, credit cards, membership cards, tickets etc., are typically provided with security markings. In order to improve the level of security and make the markings more difficult to counterfeit, typical security markings include for instance holograms, specific markings with luminescent dyes or pigments emitting in the visible spectrum upon excitation by e.g. UV radiation, watermarks, or graphical elements using a specific kind of pigment that is not easily available and/or which provides an optical impression by a specific orientation of the pigment that is difficult to achieve with commercially available equipment.

Security markings often employ luminescent materials, and the observed luminescence is used as authentication means. Herein, luminescence can be of two different types: fluorescence or phosphorescence. Fluorescence is the prompt emission of radiation upon excitation, whereas phosphorescence is the time-delayed emission of radiation, observable after the excitation has been stopped. Phosphorescence is characterized by a specific decay of the luminescence intensity in function of time; the corresponding lifetimes, which are material-specific, can range from the nanosecond to the multi-hour time scale. Neither type of luminescence can be obtained by using conventional black or colour toners as employed in e.g. photocopying machines, so that such luminescent markings cannot simply be copied.

Yet, still a drawback of such security markings is that they may be relatively easy to reproduce and/or may not be machine-readable. Further, while the optical impression of e.g. a luminescent marking as observed by the naked eye may be used as an authentication means at the place of control (e.g. at a place of sale, or ticket or entry control), many luminescent dyes are commercially available, and a counterfeiter may be able to mimic the optical appearance as observed by the naked eye. While a more sophisticated analysis of the spectral emission properties of a luminescent security marking may reveal that a marking that at first sight provides the same or similar optical appearance to the naked eye as a genuine marking is in fact forged or non-genuine, such a sophisticated analysis typically requires complex, expensive and bulky equipment that is typically not available at a place of control.

As one option for increasing the security level of a security marking on the analysis side, is it known to utilize and evaluate the decay properties of a luminescent (and in particular phosphorescent) marking. For instance, EP 1 158 459 A1 describes a method for authenticating a luminescent probe marking comprising the steps of exciting the luminescent probe marking with at least one excitation pulse, measuring probe intensity values of emission intensity (I) from emission radiation (E) of said luminescent probe marking in response to said at least one excitation pulse at time intervals, forming a probe intensity-versus-time emission function of said probe intensity values, and comparing said probe intensity-versus-time emission function with at least one reference intensity-versus-time emission function indicative for the genuineness of the marking, wherein said probe intensity-versus-time emission function and said reference intensity-versus-time emission function are normalized prior to comparison.

A drawback of this method is that pulsed excitation equipment is not easily available and may be bulky. Further, the observed intensity after a given time may be influenced by the surrounding light that may or may not excite and/or may or may not enter the detection device. Further, for relatively short decay times (i.e. fluorescence or phosphorescence with decay times of e.g. 10 ms or less), sophisticated equipment may be required to observe the intensity-versus-time emission function.

An early attempt to utilize the decay characteristics of a mixture of luminescent materials with different decay times is described in U.S. Pat. No. 3,412,245. In this document, it is described to mix two luminescent materials emitting at the same or very similar wavelength upon excitation. One of the materials has a significantly longer decay time than the other. Then, different (steady-state or DC and pulsed/alternating or AC) illumination conditions are employed, and a ratio of the signal observed under DC and AC illumination conditions is calculated and used as indicator for the presence of the respective luminescent components.

This method thus requires at least two different illumination conditions. Further, the analysis of the emission intensity and the emission profile may require complex equipment and is prone to disturbances if not performed in an isolated environment excluding for instance natural light.

A further approach relying on the decay time of a luminescent material as authenticating feature is described in WO 2005/095296 A2. Additionally, WO 2005/041180 A1 describes a photoluminescent marking where the emission intensity after a given time is compared with a reference value.

US 2013/0020504 A1 expands the above principle to security markings comprising two luminescent materials. These emit light at different wavelengths, and respective temporal intensity curves are determined. These are utilized to calculate initial intensities of the emission light components at a common time, and intensity parameters and decay parameter values for each of the emission light components are determined therefrom. The intensity parameters and the decay parameter values are then used for identification.

The document uses short light pulses of e.g. 500 µs, and hence requires suitable excitation light sources. The measurements can be repeated, and a large number of e.g. 256 measurements are used to increase accuracy. Also, rather sophisticated equipment is required for detection, as very precise intensity-time relations need to be established.

The document further emphasizes in paragraphs [0079] and [0080] that the decay constants are independent of the values of the maximal intensities, and that hence the decay constants can be used for authentication as such measured parameters allow deciding if a presence of the two distinct types of luminescent materials is confirmed or not. Conversely, the intensities as such cannot be used as means for authentication, as their magnitude depends not only on the material, but also on duration, intensity and wavelength(s) of the excitation light source as well as on the concentration of the photoluminescent material. This document thus focuses on the analysis of the behavior of the pure emitting species used in the security marking and aims at identifying the luminescent material. This identification is then used as authenticity criterion.

One drawback of the prior art methods is that typically complex, expensive and bulky equipment is required in order to provide for the desired illumination excitation conditions and/or to accurately determine the decay times of the materials. Further, prior art methods are limited to fluorescent or phosphorescent material having relatively short decay times of e.g. 10 ms or less, as a longer decay time will make a determination of the exact decay time constant more difficult and/or will prolong measurement for authentication.

Another drawback of the prior art methods is that the measurements are sensitive to the measurements conditions, and typically measurement in an isolated, specific apparatus or environment is required in order to avoid disturbances by e.g. natural light or fluctuations in illumination intensity, which may be caused by varying distances between illumination light source, security marking and detector, etc.

Further, the prior art typically relies on the luminescent properties of individual marker components (i.e. on the identity of the luminescent material), and hence only each component per se needs to be mimicked by a counterfeiter. This makes it difficult to modify a compromised (i.e. successfully forged) security marking such that the optical appearance to the naked eye is substantially maintained for the modified security marking as compared to the compromised marking, as then typically another material (i.e. another luminescent component) needs to be employed. Conversely, a relatively small change in the relative amounts of one or more luminescent components of the compromised marking will not be sufficient, as the decay characteristics of the marker remain unchanged.

The prior art methods thus typically do not allow modifying a compromised security marking such as to maintain its general appearance to the naked eye, while providing a different result in an equipment-assisted analysis. Further, for a given system of two or more luminescent materials, the prior art security markings and methods for their authentication generally do not allow obtaining clearly distinguishable markings and/or decisions on authenticity, as the methods are either insensitive to the composition (relative amounts) of the luminescent materials, or only depend on relative amount through absolute values of emitted intensities, necessitating strict control of excitation conditions and careful calibration of light sensors or through complex multi-exponential decay fitting operations for extracting several decay time constants of observed emission decay curve. The number of different authentication markers that can be realized by a system of two luminescent materials is thus typically very limited, e.g. one.

In a related aspect, the prior art methods also do not allow providing a link between security markings providing essentially the same general appearance to the naked eye, e.g. with regard to the observed colour, with another further item-specific, product-specific or batch-specific identification item, such as a batch or a range of serial numbers, a specific product line, a place of manufacture, a designated place of sale, etc., as different luminescent markers would need to be employed for the different security markings for the different batches, product lines etc., generally also leading to a different appearance to the naked eye.

Problems to be Solved by the Present Invention

In its broadest aspect, the present invention aims at providing a novel method for authenticating a security marking and a novel security marking, which complement the skilled person's choice of authentication methods and security markings and which solve the above-referenced problems of the prior art in part or fully.

In one aspect, the present invention aims at providing a novel method for authenticating a security marking utilizing the afterglow properties of a security marking that can be put into practice without the need for complex equipment and at a place of control or sale. In this and a related aspect, the present invention further aims at providing a security marking that can be used in a method solving the above object.

In this and in a related aspect, the present invention aims at providing a method for authenticating a security marking utilizing the afterglow properties of a security marking that can be implemented in existing smartphones, with or without using an additional piece of equipment for the smartphone.

The present invention further aims at providing a method for authenticating a security marking utilizing the afterglow properties of a security marking that is more robust and less likely influenced by variations in the type of equipment and outside conditions, such as presence of natural light or other lighting conditions. In this and a related aspect, the present invention thus aims at providing a method for authenticating a security marking and a security marking useful therein, which is more robust and/or less prone to give false-negative results.

In another aspect, the present invention aims at providing a security marking that can be easily modified if compromised to give a different result in an authentication method while maintaining the optical appearance of the compromised marking to the naked eye.

In yet another aspect, the present invention aims at providing security markings having essentially the same optical appearance to the naked eye, but which give rise to different results in an authentication method, to be able to link the different results to product- or batch-specific properties or identification marks without apparent differences in the security markings to the unaided eye.

In yet another aspect, the present invention aims at providing a security marking and a method for its authentication, wherein the decision on the authenticity of the marking relies not or not exclusively on the chemical identity of the luminescent material present in the marking, but also on the relative amount(s) of the one or more luminescent materials present in the security marking (even if mixed).

SUMMARY OF THE INVENTION

The method of authentication according to the invention in fact allows distinguishing both the chemical identity and the amount of each long afterglow luminescent material being present in a security marking. Particularly, as the invention allows discriminating security materials comprising a given number of chemical types of long afterglow luminescent compounds based on relative amounts of said compounds, the invention also allows creating families of security markings by varying said relative amounts, a given set of values of amounts (or concentrations) of said compounds corresponding to a "key" for identifying the specific security marking material of which composition in terms of said luminescent compounds corresponds to this very set of values or key.

The present invention solves some or all of the above problems by the following method for authenticating a security marking, security marking, readers and system for authenticating a security marking disclosed at points 1 to 23 below:

1. Method for authenticating a security marking designed to provide a long afterglow effect and comprising at least one long afterglow compound, the security marking being capable of emitting long afterglow luminescence light in a first wavelength region and said method comprising detecting said long afterglow luminescence light emitted from a first zone of the security marking in said first wavelength region, the method comprising the steps of:

a) determining a value of the detected luminescence light intensity from said first zone for a first spectral component in the first wavelength region at an initial instant;

b) determining a value of a first long afterglow parameter of the luminescence light intensity from the first zone for the first spectral component in the first wavelength region detected at step a), said value of the first long afterglow parameter corresponding to a first afterglow time elapsed since the initial instant, said first afterglow time being a time until the intensity value of the detected luminescence light for the first spectral component falls below a first threshold value being a predetermined fraction of the value of the detected luminescence light intensity from the first zone for the first spectral component in the first wavelength region determined at step a); and c) following completion of steps a) and b), performing an authentication operation that comprises comparing said determined value of the luminescence light intensity for the first spectral component at the initial instant, said determined value of the first long afterglow parameter with corresponding first reference values representative of a reference concentration value of said at least one long afterglow compound in said first zone of the security marking, and deciding that the security marking is genuine in case said determined values are within a first range around the corresponding first reference values.

2. Method for authenticating a security marking according to point 1, wherein the security marking is further capable of emitting long afterglow luminescence light in a second wavelength region and said method comprises detecting said afterglow luminescence light emitted from a second zone of the security marking in said second wavelength region, wherein:

step a) further comprises determining a value of the detected luminescence light intensity from said second zone for a second spectral component in the second wavelength region at initial instant;

step b) further comprises determining a value of a second long afterglow parameter of the luminescence light intensity from the second zone for the second spectral component in the second wavelength region detected at step a), said value of the second long afterglow parameter corresponding to a second afterglow time elapsed since the initial instant, said second afterglow time being a time until the intensity value of the detected luminescence light for the second spectral component falls below a second threshold value being a predetermined fraction of the value of the detected luminescence light intensity from said second zone for the second spectral component in the second wavelength region determined at step a); and step c) comprises performing said authentication operation by further comparing said determined value of the luminescence light intensity for the second spectral component at the initial instant, said determined value of the second long afterglow parameter with corresponding second reference values representative of a reference concentration value of said at least one long afterglow compound in said second zone of the security marking, and deciding that the security marking is genuine in case said further determined values are within a second range around said corresponding second reference values.

3. Method for authenticating a security marking according to point 2, wherein the security marking is further capable of emitting long afterglow luminescence light in a third wavelength region and said method comprises detecting said afterglow luminescence light emitted from a third zone of the security marking in said third wavelength region, wherein:

step a) further comprises determining a value of the detected luminescence light intensity from said third zone for a third spectral component in the third wavelength region at initial instant;

step b) further comprises determining a value of a third long afterglow parameter of the luminescence light intensity from the third zone for the third spectral component in the third wavelength region detected at step a), said value of the third long afterglow parameter corresponding to a third afterglow time elapsed since the initial instant, said second afterglow time being a time until the intensity value of the detected luminescence light for the third spectral component falls below a third threshold value being a predetermined fraction of the value of the detected luminescence light intensity from said third zone for the third spectral component in the third wavelength region determined at step a); and step c) comprises performing said authentication operation by further comparing said determined value of the luminescence light intensity for the third spectral component at the initial instant, said determined value of the third long afterglow parameter with corresponding third reference values representative of a reference concentration value of said at least one long afterglow compound in said third zone of the security marking, and deciding that the security marking is genuine in case said further determined values are within a third range around said corresponding third reference values.

4. Method for authenticating a security marking according to any one of points 1 to 3, wherein the method is implemented in a reader equipped with a camera capable to detect said long afterglow luminescence light emitted by the security marking, and equipped with a software, stored in a memory of the reader together with reference values representative of a reference concentration value of said at least one long afterglow compound in said security marking, the software being operable to implement the steps of the method when running on a CPU unit of the reader.

5. Method for authenticating a security marking according to any one of points 1 to 3, wherein steps a) and b) of the method are implemented in a reader equipped with communication means and operable to send data via a communication link to a server having a server CPU unit and a database storing said reference values representative of a reference concentration value of said at least one long afterglow compound, the reader being further equipped with a camera capable to detect said long afterglow luminescence light emitted by the security marking, and equipped with a software stored in a memory of the reader and operable to execute said steps a) and b) of the method when running on a CPU unit of the reader;

wherein, upon completion of steps a) and b) of the method, the reader sends to the server via the communication link said determined values of detected luminescence light intensity and said determined values of long afterglow parameter; and the server CPU unit performs a comparison, according to step c) of the method, of the determined values received from the reader with corresponding reference values representative of a reference concentration value of said at least one long afterglow compound stored in the database, and decides that the security marking is genuine based on a result of the comparison.

6. Method for authenticating a security marking according to point 4 or point 5, wherein the reader is equipped with a light source, which is preferably a LED, capable of delivering excitation light to cause said at least one long afterglow compound of the security marking to emit said long afterglow luminescence light, the method, when running on the CPU unit of the reader, comprising a preliminary step of illuminating the security marking with excitation light by means of the light source.

7. Method for authenticating a security marking according to point 6, wherein said wavelength regions of the long afterglow luminescence light emitted by the security marking are at least partially in the visible range, said camera comprises a RGB diode, said light source is a white LED and wherein the long afterglow luminescence light in the first wavelength region is detected on a first channel selected from R, G and B of the camera.

8. Method for authenticating a security marking according to point 7, wherein the long afterglow luminescence light in the second wavelength region is detected on a second channel selected from R, G and B of the camera that is different from the first channel.

9. Method for authenticating a security marking according to point 8, wherein the long afterglow luminescence light in the third wavelength region is detected on a third channel selected from R, G and B of the camera that is different from the first and second channels.

10. Method for authenticating a security marking according to any one of points 1 to 9, wherein the first zone, optionally the second zone and further optionally the third zone are the same or are distinct.

11. A security marking designed to provide a long afterglow effect and comprising at least one long afterglow compound, adapted for being authenticated by the method according to any one of points 1 to 10, or an article provided with the security marking.

12. A reader having a CPU unit and a memory and being equipped with a software for implementing the method according to point 4, the reader comprising a camera capable to detect said long afterglow luminescence light emitted by the security marking, said software stored in the memory being operable to implement the steps of the method when running on the CPU unit, said reader being preferably a handheld computing device and more preferably a telecommunication device or a tablet.

13. The reader according to point 12, being preferably a cell phone, that is equipped with a light source, which is preferably a LED, capable of delivering excitation light to cause said at least one long afterglow compound of the security marking to emit said long afterglow luminescence light, the reader being operable to illuminate the security marking with excitation light by means of the light source, wherein said software, when running on the CPU unit of the reader, is capable of executing a preliminary step of illuminating the security marking with excitation light by means of the light source.

14. A reader having a CPU unit, a memory and being equipped with a software stored in the memory operable to implement steps a) and b) of the method according to any one of points 1 to 3 when running on the CPU unit, the reader comprising a camera capable to detect said long afterglow luminescence light emitted by the security marking; the reader being equipped with communication means operable to send data to a server via a communication link; the reader, upon completion of steps a) and b) of the method, being operable to send to the server via the communication link said determined values of detected luminescence light intensity and said determined values of long afterglow parameter; said reader being preferably a handheld computing device and more preferably a telecommunication device or a tablet.

15. The reader according to point 14, being preferably a cell phone, that is equipped with a light source, which is preferably a LED, capable of delivering excitation light to cause said at least one long afterglow compound of the security marking to emit said long afterglow luminescence light, the reader being operable to illuminate the security marking with excitation light by means of the light source, wherein said software, when running on the CPU unit of the reader, is capable of executing a preliminary step of illuminating the security marking with excitation light by means of the light source.

16. The reader according to point 15, for detecting long afterglow luminescence from a security marking for which said wavelength regions are at least partially in the visible range, wherein said camera comprises a RGB diode, said light source is a white LED and wherein the camera is capable of detecting the long afterglow luminescence light in the first wavelength region on a first channel selected from R, G and B.

17. The reader according to point 16, wherein the camera is capable of detecting the long afterglow luminescence light in the second wavelength region on a second channel selected from R, G and B that is different from the first channel.

18. The reader according to point 17, wherein the camera is capable of detecting the long afterglow luminescence light in the third wavelength region on a third channel selected from R, G and B that is different from the first and second channels.

19. System for authenticating a security marking designed to provide a long afterglow effect and comprising at least one long afterglow compound, the security marking being capable of emitting long afterglow luminescence light, the system being operable to implement the steps of the method according to any one of points 1 to 3, the system comprising:

a server having a server CPU unit and a database storing said reference values representative of a reference concentration value of said at least one long afterglow compound; and a reader equipped with a CPU unit, a memory and a camera capable to detect said long afterglow luminescence light emitted by the security marking, and equipped with a software stored in the memory and operable to implement steps a) and b) of the method when running on the CPU unit, the reader being equipped with communication means operable to send to the server via a communication link said determined values of detected luminescence light intensity and said determined values of long afterglow parameter resulting from completion of steps a) and b) of the method; wherein the server CPU unit is capable to perform a comparison, according to step c) of the method, of the determined values received from the reader with corresponding reference values representative of a reference concentration value of said at least one long afterglow compound stored in the database, and decide that the security marking is genuine based on a result of the comparison.

20. The system according to point 19, wherein the reader is equipped with a light source, which is preferably a LED, capable of delivering excitation light to cause said at least one long afterglow compound of the security marking to emit said long afterglow luminescence light, wherein the software is capable, when running on the CPU unit of the reader, to execute a preliminary step of illuminating the security marking with excitation light by means of the light source of the reader.

21. The system according to point 20, wherein said wavelength regions of the long afterglow luminescence light emitted by the security marking being at least partially in the visible range, said camera comprises a RGB diode, said light source is a white LED and wherein the camera is capable of detecting the long afterglow luminescence light in the first wavelength region on a first channel selected from R, G and B.

22. The system according to point 21, wherein the camera is capable of detecting the long afterglow luminescence light in the second wavelength region on a second channel selected from R, G and B that is different from the first channel.

23. The system according to point 22, wherein the camera is capable of detecting the long afterglow luminescence light in the third wavelength region on a third channel selected from R, G and B that is different from the first and second channels.

BRIEF DESCRIPTION OF THE DRAWINGS

FIG. 4 includes 3 examples for 3 different keys. The keys are obtained according to the composition of long afterglow compounds given in the table below (afterglow times are determined at 35% of initial green and red emission intensity values):

| key | Luming Technology Group CO., LTD, PLO-6B (concentration %), Green | Luming Technology Group CO., LTD, RR-7 (concentration %), Red |
|---|---|---|
| 1 | 12 | 30 |
| 2 | 4 | 4 |
| 3 | 8 | 15 |

Figure 4:
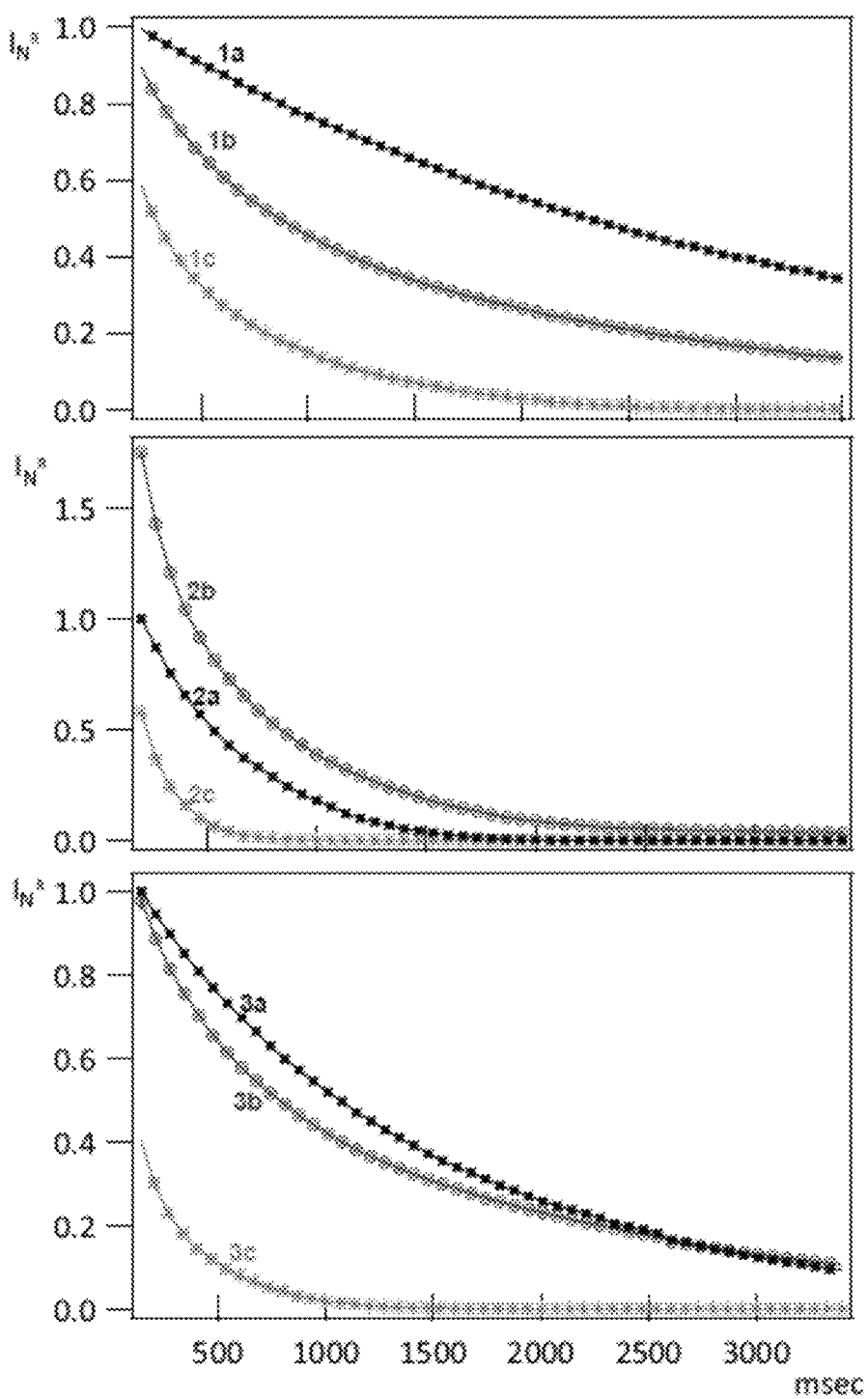
FIG. 4 shows three examples of light intensity vs time measured in the respective R- and G-channels of a smartphone camera. Three different ratios of long afterglow compounds concentrations are shown, showing the broad possibility of creating different keys with only 2 long afterglow pigments, i.e. creating different signatures with two long afterglow pigments, each signature or key being representative of a specific concentration of the first pigment and the second pigment in the security marking.

In FIG. 4, the following reference signs are used for emission curves:
1a: normalized observed emission on R channel for key 1
1b: normalized observed emission on G channel for key 1
1c: normalized observed emission on B channel for key 1
2a: normalized observed emission on R channel for key 2
2b: normalized observed emission on G channel for key 2
2c: normalized observed emission on B channel for key 2
3a: normalized observed emission on R channel for key 3
3b: normalized observed emission on G channel for key 3
3c: normalized observed emission on B channel for key 3.

In each figure, the respective RGB intensities are each normalized to the initial value of the red (R) intensity $I_0^R$, as indicated by $I_N^R$, i.e. with emission curves $(I^R/I_0^R)$ giving curves 1a, 2a, 3a, emission curves $(I^G/I_0^R)$ giving curves 1b, 2b, 3b and emission curves $(I^B/I_0^R)$ giving curves 1c, 2c, 3c.

Figure 5:
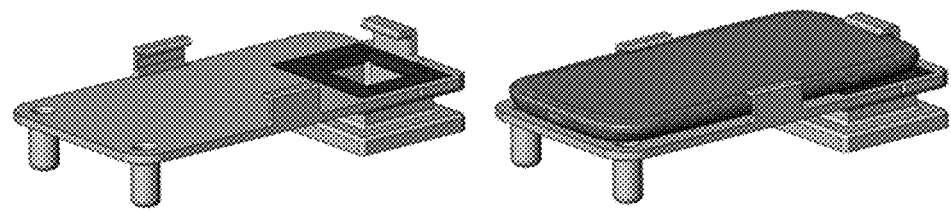

FIG. 5 shows an illustrative example of camera hood (left) and a smartphone equipped with such a camera hood (right).

Figure 6:
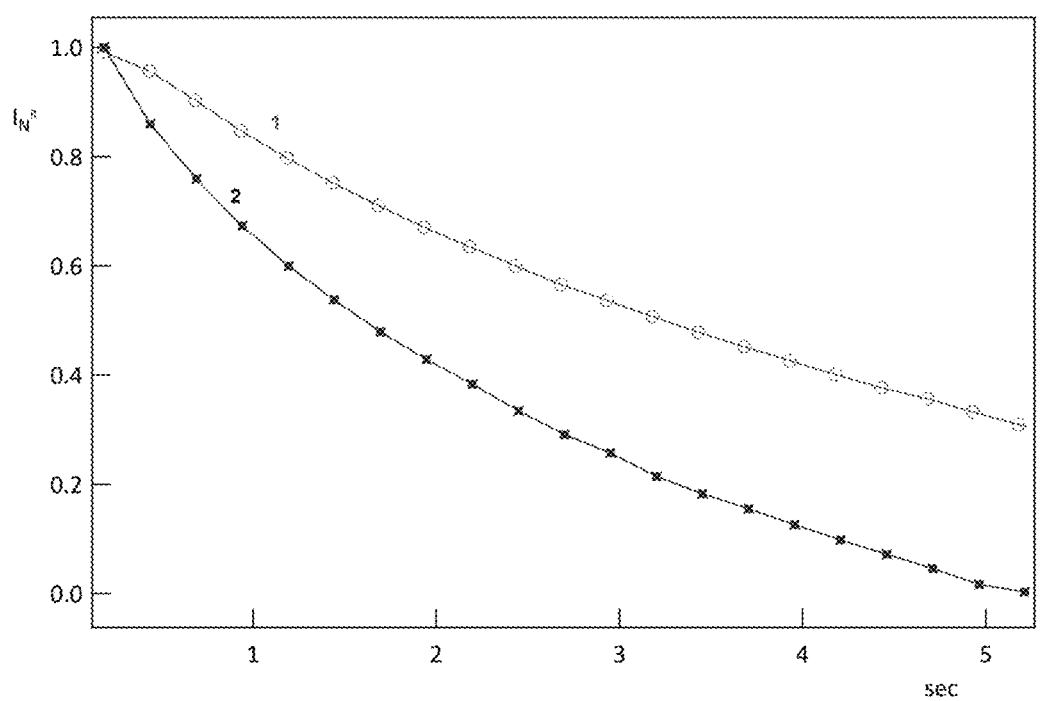

FIG. 6 illustrates the concept of keys for two security marking materials printed on a substrate containing a single long afterglow compound, i.e. containing the red emitting pigment from Luming Technology Group CO., LTD, RR-7, but with different concentrations. The corresponding concentrations of the red pigment are reported in the table below:

| key | Luming Technology Group CO., LTD, RR-7 (concentration %) |
|---|---|
| 1 | 30 |
| 2 | 15 |

Excitation of this pigment is between wavelengths 400-550 nm, thus a white LED is perfectly suited for the excitation of these markings. On the other hand, the long afterglow emission is between 600-700 nm, thus the collection of the long afterglow emission is done on the R channel a camera. For measuring emission light intensity curves, instead of using a classical phosphorimeter (not equipped with a white excitation LED, but having instead UV diodes), we use a dedicated apparatus comprising a camera Microeye U15240SE, objective F1.4-16C12 mm (Edmund optics 56-787) and a white LED, both placed at 47 mm from the sample (i.e. printed security marking). The settings for the camera are the following:

Image gain 2.50×50+gain boost;
Camera frame rate 4 (250 ms);
Exposure time 249.91 ms.
Duration of excitation with the white LED is 2 s.

With the above mentioned apparatus, we could use white LED excitation, the same as one finds in smartphones, making this measurement closer to what we get with a smartphone.

Said FIG. 6 shows long afterglow intensity decay curves 1 and 2, respectively corresponding to the two different (relative) concentrations of the above mentioned same long afterglow compound (red pigment) in the printed security marking material: curve 1 corresponds to a concentration of 30% and curve 2 corresponds to a concentration of 15%. Both emission intensity curves I(t) have been normalized to the initial intensity value $I_0^{R1}$ of curve 1 for easier comparison. Clearly, both curves have distinct shapes, are of the non mono-exponential type and the respective afterglow times are visibly distinct (for example, measured at 35% of the initial emission intensity). Thus, different concentrations of a long afterglow compound in a material of a security marking can indeed be used as material authenticating keys of said security marking, by contrast with classical luminescent compounds (i.e. without persistent luminescence effect) for which afterglow time does not depend on concentration (or local amount) of said luminescent compound. The method of authenticating a security marking according to the invention precisely exploits this very property of the long afterglow compounds and provides the relevant parameters to be considered for reliable authenticity check.

DEFINITIONS

For the purposes of the present invention, the term "at least one" means one or more, preferably one, two, three, four, five, six or seven, more preferably one, two, three, four, or five, even more preferably one, two, or three, and most preferably one or two. The same applies to the term "one or more". Further, the terms "two or more" or "at least two" denote that minimum two of the recited components be present, but allows for the presence of further types of the same component, such as three, four, five, six or seven, more preferably two, three, four, or five, even more preferably two or three, and most preferably two.

If, in the present description, an embodiment, feature, aspect or mode of the invention is stated to be preferred, it should be understood that it is preferred to combine the same with other preferred embodiments, features, aspects or modes of the invention, unless there are evident incompatibilities. The resulting combinations of preferred embodiments, features, aspects or modes are part of the disclosure of the present description.

The term "comprising" is used open-endedly. Accordingly, e.g. a composition "comprising" a certain component may contain other components in addition. The term however also includes the meanings of "consisting of" and "consisting essentially of", as far as this is technically possible.

The term "ink" shall denote any material in liquid or viscous form that can be used in a printing, stamping or spraying process. The inks used in the present invention can be suitably selected from screen printing inks, gravure printing inks, intaglio printing inks, bar coater inks, offset printing inks stamping ink, glue, spraying ink, varnishes and other ink types known to the skilled person.

"Visible range" means from 400 to 700 nm, "UV range" from 40 to less than 400 nm and "IR range" from more than 700 nm to 2400 nm.

"Fluorescence" denotes the emission of electromagnetic radiation from an excited state of a material having a lifetime (or decay constant) τ of equal to or less than $10^{-5}$ seconds in terms of exponential decay according to $$I = I_0\, e^{-\frac{t}{\tau}},$$

where t denotes time in seconds and I the fluorescence emission intensity.

"Phosphorescence" denotes the emission of electromagnetic radiation from an excited state of a material having a lifetime τ of $10^{-5}$ seconds or longer to 1 s or less in terms of exponential decay according to $$I = I_0\, e^{-\frac{t}{\tau}},$$

where t denotes time in seconds and I the phosphorescence emission intensity.

"Long afterglow" or "persistent luminescence" denotes light emission from a luminescent compound (comprising luminescent ions embedded in a material) that has a lifetime of greater than 1 second, wherein the long afterglow intensity decay curve is not mono-exponential. This non mono-exponential behavior being due to de-excitation of an excited state between the valence band and the conduction band of the compound via some pumping mechanisms involving intermediate energy levels for (re)populating said excited state (by thermal excitation of closest material of each luminescent ion), as explained below. As a result, the long afterglow parameter depends on the local amount of said closest material embedding the luminescent ions (and perturbating its luminescence properties).

In the present invention, all properties relate to those at 20° C. and standard pressure ($10^5$ Pa), unless stated differently.

If a range is defined by end values a and b, these are included when any one of the words "between", "from" and "to" or the sign "-" is used. As an example, a range "from 5 to 10", "between 5 and 10" and "5-10" includes both the values 5 and 10, as well as values greater than 5 and less than 10. The terms are thus used short-handedly in order to express "equal to or greater than a, and equal to or smaller than b".

In the present invention, the term "about" shall denote that variations from e.g. specific values are allowed within the boundaries in which essentially the same effect is achieved. Generally, "about" means that a variation of +/−10%, preferably +/−5% is allowed. The terms "essentially" and "substantially" have the same meaning.

DETAILED DESCRIPTION OF THE PRESENT INVENTION

Authentication Method

The present invention relates to a method for authenticating a security marking designed to provide a long afterglow effect and comprising at least one long afterglow compound, the security marking being capable of emitting long afterglow luminescence light in a first wavelength region and said method comprising detecting said long afterglow luminescence light emitted from a first zone of the security marking in said first wavelength region, the method comprising the steps of:

a) determining a value of the detected luminescence light intensity from said first zone for a first spectral component in the first wavelength region at an initial instant;

b) determining a value of a first long afterglow parameter of the luminescence light intensity from the first zone for the first spectral component in the first wavelength region detected at step a), said value of the first long afterglow parameter corresponding to a first afterglow time elapsed since the initial instant, said first afterglow time being a time until the intensity value of the detected luminescence light for the first spectral component falls below a first threshold value being a predetermined fraction of the value of the detected luminescence light intensity from the first zone for the first spectral component in the first wavelength region determined at step a); and c) following completion of steps a) and b), performing an authentication operation that comprises comparing said determined value of the luminescence light intensity for the first spectral component at the initial instant, said determined value of the first long afterglow parameter with corresponding first reference values representative of a reference concentration value of said at least one long afterglow compound in said first zone of the security marking, and deciding that the security marking is genuine in case said determined values are within a first range around the corresponding first reference values.

The first zone on the security marking, from which long afterglow emission is measured, can be as a single piece or can be composed of several pieces spread out over the security marking, and each piece can have a different concentration of the at least one long afterglow compound (thus allowing complex authenticating signature of the marking, more difficult to counterfeit).

According to the invention, it is possible to detect long afterglow luminescence intensity in a plurality of wavelength regions, which makes authentication of the security marking more reliable.

Also, according to the invention, the security marking can comprise several distinct long afterglow compounds, some of them being possibly mixed, disposed in some zones of the marking from which they can emit luminescence light. In each zone, the long afterglow compounds can form one uniform layer or can be distributed on several stacked layers. The long afterglow compounds can also be part of some pattern (like a 2D barcode, for example).

Although the method according to the invention, in the embodiments corresponding to the above mentioned points 1 (i.e. with detection of one spectral component of emitted luminescence light intensity in one wavelength region or channel), or 2 (i.e. with detection of two spectral components of emitted luminescence light intensity in two wavelength regions or channels), or 3 (i.e. with detection of three spectral components of emitted luminescence light intensity in three wavelength regions or channels), involve measuring luminescence light for one, two or three spectral components, it is possible to consider additional spectral components of the luminescence light as well as additional channels of detection.

The terms and materials used in the definition of the method as outlined above and the steps of the method are described in further detail below:

"Method for authenticating" relates to any method that is intended to verify the authenticity of a marking. "Authentic" in this regard means that the marking is indicative of the origin and/or validity of the product or item on which the marking is provided. As such, for instance a banknote is "authentic" in this sense if it has been issued by an authority authorized for issuing banknotes (e.g. a central bank), and a non-authentic banknote is one that has been forged or counterfeited.

The same holds true for instance for event tickets or travel tickets. In a similar manner, "authentic" can mean that the product has indeed been manufactured by a company or person given on the label, or an authorized sub-manufacturer.

"Security marking" denotes an element that is present on an item to be marked as "authentic". The element may or may not be visible to the naked eye under normal daylight or an incandescent lamp. In one embodiment, the "security marking" is in the form of a print on a suitable substrate, such as paper, cardboard or plastic. In this and in other embodiments, the security marking comprises or is part of a logo, a symbol, a letter, indicia, a code, a serial number, or a graphical element.

"Long Afterglow effect" in the sense of the present invention means the emission of electroluminescent radiation, preferably in the visible range, due to the occurrence of a long afterglow effect. The long afterglow effect needs to last for sufficient time with sufficient intensity in order to allow a suitable detection of luminescence light intensity at the below-defined "initial instant" and "afterglow time".

Fluorescence and phosphorescence are believed to be caused by electronic transitions within an emitter species. Here, an electron is excited to a higher energy level by absorbing energy, and then a radiative decay to a lower energy level is observed. The time required for this process depends only on the species itself, and differs depending on whether or not the decay is spin-allowed (fluorescence) or is spin-forbidden (phosphorescence).

Conversely, the long time part of a decay curve of a substance showing long afterglow emission is believed to be due to the presence of intermediate energy levels resulting from interaction between the emitting ion and its closest material environment, particularly vacancies. See, e.g. Koen Van den Eeckhout et al, Persistent Luminescence in Non-$Eu^{2+}$-Doped Compounds: A Review *Materials* 2013, 6, 2789-2818; or A. R. Mirhabibi et al. Pigment & Resin Technology, Volume 33, • Number 4, 2004, 220-225.

In such materials, it is believed that allowing maintaining luminescence is possible by de-excitation of an excited state between the valence band and the conduction band via some pumping mechanisms involving such intermediate energy levels for (re)populating said excited state by thermal excitation of said closest material. This additional excitation over time comes from the close material, due to energy trapping and corresponding energy transfer. As a result, the (long) afterglow time (i.e. the time until the light emission intensity falls below a certain threshold, e.g. corresponding to a fraction of 30% of the light intensity observed at the "initial instant") depends not only on the emitter species, but also on other factors, in particular the local amount of (close)

material. As thermal excitation of the material can provide a pumping mechanism for maintaining long afterglow emission (and thus, changing the afterglow time), measurements of long afterglow intensity from the material are performed at a given temperature of the material, and reference data relating to the material are also measured at substantially the same temperature.

Hence, the observed afterglow time not only depends on the material, but even on its concentration, in case the long afterglow compound is distributed uniformly in the security marking. In case the security marking comprises several layers, each layer with a uniform distribution of long afterglow compound at given concentration (for example), then for each local area on the marking providing long afterglow emission, the local amount of material participating in said emission is characterized by an "apparent" concentration (i.e. locally averaged over a thickness of the layers). In general, for a security marking having a non-uniform distribution of long afterglow compound, the observed afterglow time relating to long afterglow emission from a local area on the security marking depends on the local amount of long afterglow compound participating to the emission within a thickness of the marking under said local area, and thus can also be characterized by an apparent concentration (i.e. local average concentration through the thickness). In the following, the term concentration is used for "apparent" concentration. This opens the possibilities of creating different "keys", i.e. authentication criteria, that do not only depend on the choice of materials, but also on their amount. The afterglow time is thus a kind of proxy that reflects several properties of the marking beside the nature of the emitting species, e.g. its local amount. The long afterglow parameter is thus not only representative of the materials used, but resemble the exact composition and structure of the emitting parts of the security marking, forming a specific "key" for characterizing the marking. The long afterglow parameter varies as the concentration of the long afterglow compound varies in the security marking. This effect cannot be observed with a conventional luminescent compound (fluorescent or phosphorescent) and can only be observed for a long afterglow compound: such a dependency on the local amount of long afterglow compound is due to the above mentioned energy trapping and energy transfer mechanisms reflecting the specific interaction of each (luminescent) emitting ion with close material of the marking. See FIG. 6 for an example of one long afterglow compound with long afterglow decay curves 1 and 2 corresponding to two different concentrations. See also FIG. 4 for an Example of different "keys" deriving from different local amounts of a mixture of two different long afterglow compounds having different concentrations (here, there are two long afterglow parameters, one for each afterglow time of each long afterglow compound).

The factors influencing the observed emission intensity at the "initial" instant" and the "value of the long afterglow parameter" include, with respect to the nature and composition of the security marking, (i) the concentration of the afterglow compound(s) (phosphorescent compound) in the security marking, (ii) the population density (saturation) of excited states capable of emitting detected luminescence light of the spectral component detected, (iii) the decay characteristics of the long afterglow compound, and (iv) the way of incorporation of the long afterglow compound into the security marking, in particular with regard as to whether all of or a substantial amount of the emission from the security marking leaves the security marking such as to be able to reach a light detector.

These factors can all be influenced by a skilled person based on common knowledge. The area concentration (i) can be adjusted by increasing or decreasing the concentration of the long afterglow compound in the ink used for providing the security marking and/or the amount of ink applied to a given area. The population density (ii) of excited states capable of emitting detected luminescence light of the spectral component detected can be increased, typically by irradiating with excitation radiation, but in some cases also by providing suitable energy in other form, e.g. by heating, as far as possible. If, in rare cases, a decrease of the population density is desired, this can be achieved by storing the security marking in the dark for a sufficient time. The decay characteristics (iii) of the long afterglow compound are material-specific (at a given temperature), but the skilled person has the choice between different materials having different decay characteristics. The way of incorporation (iv) can be adjusted e.g. by providing (or not providing) additional layers on the security marking, the colour of the background, etc.

"Long Afterglow compound" in the sense of the present application means a compound capable of emitting electromagnetic radiation, preferably in the visible spectrum, due to persistent luminescence effect, with a contribution of decaying emission having a non-mono-exponential decay. The emission of this electromagnetic radiation is also referred to as "long afterglow luminescence light" or "long afterglow effect".

For practical purposes, the long afterglow effect must occur, for a spectral component in a wavelength region, for a long enough time in order to be detectable by relatively unsophisticated equipment, such as a cell phone camera, so that the detectable light emission for the spectral component in the wavelength region must last for at least 100 ms or longer, preferably 250 ms or longer, more preferably 500 ms or longer, and even more preferably 1 s or longer, before they become non-detectable, after stop of excitation. Further, in order to be able to determine a long afterglow parameter, the "initial instant" and "afterglow time elapsed since the initial instant" must both be within these ranges. This means that the decay of the emission forming the spectral component in the wavelength region should be reasonably long, such as having emission lifetimes $\tau$ of 100 ms or greater, more preferable 250 ms s or greater, and more preferably 500 ms or greater.

Long afterglow compounds are well known in the art and can be chosen by the skilled person as desired. Examples of long afterglow compounds are phosphorescent pigments having an inorganic host structure doped with one or more rare earth metals, such as alkaline earth aluminates and silicates, Ca:Eu, Tm, ZnS:Eu, doped CaS, etc. Such compounds are commercially available, e.g. Luming Technology Co. Ltd. such as PLO-6B (green pigment) and RR-7 (red pigment).

Further, any (i.e. first, second, third . . . ) long afterglow parameter of the detected luminescent light intensity for a spectral component in a wavelength region, is then utilized in an authentication operation. Here, said determined values of the respective luminescence light intensities for a spectral component at the initial instant, said determined value of the long afterglow parameter with corresponding reference values, for a given zone of the security marking, are put into context and related to each other, and it is then decided whether or not the security marking is genuine, i.e. has concentration value of the at least one afterglow compound in said zone corresponding to that of a (reference) genuine security marking used for measuring the reference values.

This is generally the case if said determined values or one or more parameters derived therefrom are within a range of expectation values that are deemed to represent an authentic material, such as when the values are close enough to the corresponding reference values. Mathematically, this could in one embodiment be expressed as follows: for instance, a metric (i.e. relationship value D) for authenticating a marking may be based on a relation Rel between the measured intensities $I_0$ at the initial instant and the afterglow time $\tau\_0$ (for each considered channel, i.e. each wavelength region), and these may then be related to corresponding reference values or ranges thereof. This allows defining several metrics D for obtaining, for example, a scalar criterion for estimating authenticity. As one example, if the authentication is confined to a simple Euclidian metric of two channels R and G of a RGB diode used for measuring emission light intensities, one may define D as follows, for first and second spectral components and corresponding first and second long afterglow parameters: $D=[(I_0^R-I_0^{R\,ref})^2+(I_0^G-_1^{G\,ref})^2+(\tau^R-\tau^{R\,ref})^2+(\tau^G-\tau^{G\,ref})^2]^{1/2}$ in a four dimensional space $(I_0^R, I_0^G, \tau^R, \tau^G)$, wherein $I_0^R$ and $I_0^{R\,ref}$ are, respectively, the determined value and reference value of detected long afterglow luminescence light intensity (from a given zone of the security marking) for a spectral component in a wavelength region corresponding to channel R at initial instant; $I_0^G$ and $I_0^{G\,ref}$ are, respectively, the determined value and reference value of detected long afterglow luminescence light intensity (from a given zone of the security marking) for a spectral component in a wavelength region corresponding to channel G at initial instant; $\tau^R$ and $\tau^{R\,ref}$ are, respectively, determined afterglow time and reference afterglow time for the spectral component of the long afterglow luminescence light emitted in channel R (not to be confused with classical luminescence decay time constants); and $\tau^G$ and $\tau^{G\,ref}$ are, respectively, determined afterglow time and reference afterglow time for the spectral component of the long afterglow luminescence light emitted in channel G.

Alternatively, in a (reduced) two dimensional space, D may be defined as follows: $D=[(I_0^R/I_0^G-I_0^{R\,ref}/I_0^{G\,ref})^2+(\tau_R/\tau_G-\tau^{R\,ref}/\tau^{G\,ref})^2]^{1/2}$.

The sensitivity of the method in the sense of the ability to distinguish between genuine and non-genuine markings can be increased by increasing the number of parameters to be considered. Choosing too few parameters may result in poorer discrimination, for example, by selecting merely $D=(\tau^R/\tau^G)$ or $D=[(\tau^R-\tau^{R\,ref})^2+(\tau^G-\tau^{G\,ref})^2]^{1/2}$.

Thus, preferably the following parameters are involved in the authentication operation: initial emission intensity and long afterglow parameter for each spectral component considered, and corresponding reference values. According to the invention, it is also possible to use non-scalar metric for estimating authenticity: for example, a vector having components, one for each wavelength region (or spectral component) considered, corresponding to distance values between measured parameters for a security marking and corresponding reference values for a genuine security marking.

Moreover, said vector can have its components splitted for each region of the security marking considered so as to even increase reliability of authentication (as counterfeiting of corresponding security marking becomes more difficult).

A relation Rel, for example in case of two channels R and G, involves parameters $\{I_0^R, I_0^{R\,ref}, I_0^G, I_0^{G\,ref}, \tau^R, \tau^{R\,ref}, \tau^G, \tau^{G\,ref}\}$ in order to reliably authenticate a marking. Consequently, the relationship value D should also involve these 8 parameters (in case of two channels). In case of three channels R, G and B, D should further involve the 4 parameters $I_0^B$, $I_0^{B\,ref}$, $\tau^B$ and $\tau^{B\,ref}$. D can however also be splitted in three components, one for each channel, involving each corresponding 4 parameters, and/or even further splitted by region of emission on the security marking.

In general, a "measured point" in the space of parameters (in the above example, the dimension of this space is 4), having the values of the parameters as coordinates, must be close to a "reference point", of which coordinates are the reference values of the parameters, in order the marking is considered as genuine. For example, if a distance between these two points is considered, the "measured point" must be within a neighbourhood of a given radius ε around said "reference point" (this is clearly equivalent to defining some range of admissible values around each reference value).

In practice, in case a distance D in the space of the authenticating parameters (i.e. initial value of each spectral component of the emitted luminescence light, possibly by zone, and value of each corresponding long afterglow parameter) is used, it is preferable to normalize the parameters to make them rescaled and adimensional. For example, for each dimension of the space of parameters under consideration:

spectral component intensity: the lowest intensity level is put to 0 (shift on the intensity axis for the spectral component), and the difference between highest intensity level and the lowest intensity level is put to 1 (rescaling), so that the measured normalized intensities for this spectral component can only take values between 0 and 1;

long afterglow parameter: the lowest value is put to 0, and the difference between the highest possible value and the lowest value (for the spectral component under consideration) is put to 1, so that the observed long afterglow parameter values are in the range 0 to 1.

Then, a typical authentication criterion is that the marking is genuine only if $D \leq \varepsilon$. For example, $\varepsilon=0.5$ or preferably $\varepsilon=0.1$.

The security marking will then be considered as genuine in case, for example, $D \leq \varepsilon$ (with given $\varepsilon > 0$), i.e. if measured values $(I_0^R, I_0^G, \tau^R, \tau^G)$ are sufficiently close to corresponding reference values $(I_0^{R\,ref}, I_0^{G\,ref}, \tau^{R\,ref}, \tau^{G\,ref})$. Another (equivalent) possibility, for example, is to define a range of values around each reference value within which corresponding determined values must fall in order the security marking is considered as being genuine.

It follows that it is for instance possible to calculate, in case of detection of long afterglow emissions over two channels (for illustrative example), a value or parameter (e.g. a ratio, distance etc. . . . ) from the determined values of the first and second afterglow parameter, each respectively corresponding to an afterglow time, which may then be utilized in the authentication operation. For practical purposes and in order to minimize error in the determination of the afterglow time, a clearly detectable variation between the first and second long afterglow parameters of the detected light intensities should have occurred when intensities are measured when falling down below the fraction values of their initial values corresponding to the respective first and second threshold values. This means that in order to allow performing all steps of the method of the present invention reasonably quick (such as in a total of 10 s or less, preferably 5 s or less, and further preferably 2 s or less), the decay of the emission forming the first spectral component in the first wavelength region and the decay of the emission forming the second spectral component in the second wavelength region should both be reasonably rapid for said fraction values, such as having afterglow times of 15 s or less, more preferable 10 s or less. Consequently, for given excitation illumination conditions sufficient for allowing detection of long afterglow emission intensity, the first and second threshold values must be set so as to allow such emission afterglow times (by choosing fractions of at least 20%, preferably 30% or more).

A "wavelength region" in the sense of the present invention is generally a bandwidth of electromagnetic radiation wavelengths spanning typically 30-300 nm, preferably 50-250 nm and more preferably 75-200 nm, and most preferably 100-180 nm. The wavelength regions of the present invention can be fully in the visible range, fully in the non-visible (IR or UV) range, or can partly be in the visible and party in the non-visible range. Preferably, all of the first and second and any further wavelength region optionally employed in the present invention are all fully within the visible range of 400-700 nm. For example, a wavelength region spanning a bandwidth of 130 nm may be from 470-600 nm.

The first and second wavelength region, and, if optionally employed any further wavelength region, may partly overlap, or may be completely separate. An example of two partly overlapping first and second wavelength regions of each 150 nm bandwidth are a first wavelength region spanning wavelengths from 470-620 nm, and a second wavelength region from 550-700 nm. A third wavelength region may then be between 400-550 nm. If the wavelength regions partly overlap, it is preferably that the any wavelength region overlaps to an extent such that not more than 70%, more preferably not more than 50%, and further preferably not more than 25%, of a wavelength region also forms part of another wavelength region.

Figure 3:
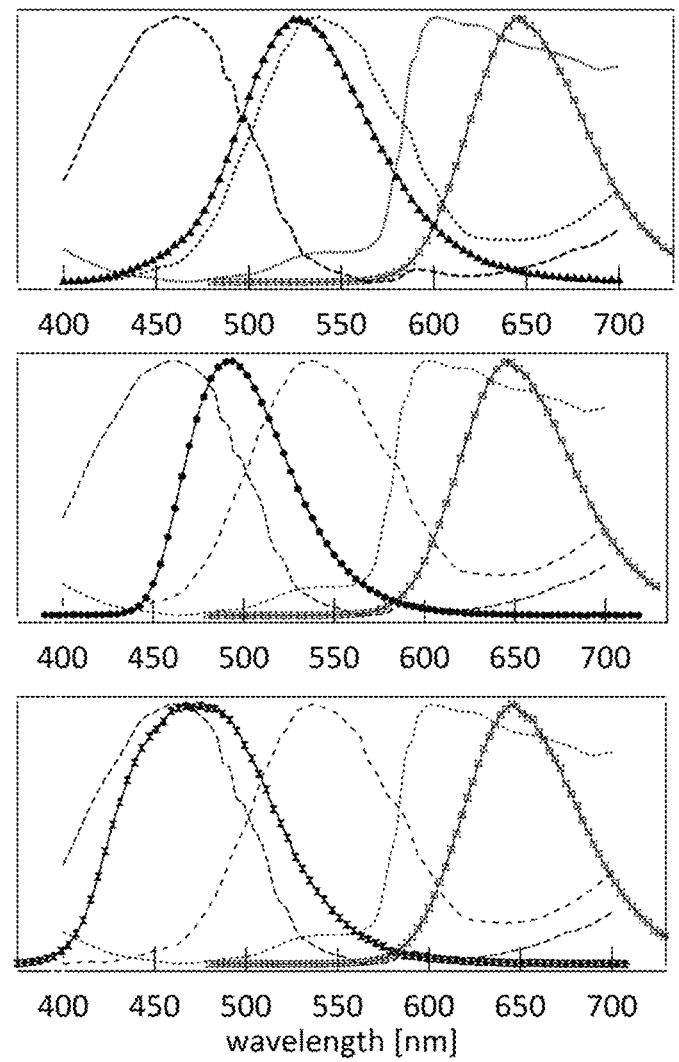
FIG. 3 shows emission intensities of three different security markings, each with two long afterglow compounds (full lines) and overlaps between the emitting compounds and respective three wavelength regions or RGB channels of a camera (dotted lines).

The wavelength regions of the method of the present invention are the wavelength regions in which long afterglow emission is detected by a detector, and preferably correspond to the channels of a camera, such as the RGB channels of a cell phone camera (see also FIG. 3). Accordingly, the "first wavelength region" preferably covers electromagnetic radiation with wavelengths A) of from about 400-about 550 nm, B) from about 460 to about 600 nm, or C) from about 560 to 700 nm, and the "second wavelength region" covers another one from A)-C) as compared to the "first second wavelength region". If a "third wavelength region" is employed, the "first", "second" and "third" wavelength regions preferably correspond to the ranges A), B) and C), respectively.

A "spectral component in a wavelength region" generally refers to electromagnetic radiation entirely falling within a wavelength region and not extending over the entire bandwidth of the wavelength region. The spectral component may itself be a smaller wavelength region falling within the wavelength region, i.e. may be a sub-set of the wavelength region of e.g. 10 or 20 nm bandwidth, or may even be a single wavelength. The single wavelength may be a peak wavelength or may not be a peak wavelength of the emission emitted by a long afterglow compound. The intensity of the detected spectral component may relate to all electromagnetic radiation, or may relate to only a sub-set of the electromagnetic radiation, such as polarized light.

In a preferred embodiment, the "spectral component in one wavelength region" falls only within the part of the said wavelength region that is not also part of another wavelength region, and the same is preferably true for a further spectral component and corresponding other one wavelength region, respectively. This ensures a proper distinction between the measurement/detection in the wavelength regions and proper attribution of the observed emission to the correct wavelength region.

A "value of the detected luminescent light intensity" is defined in the present invention as any value that is directly correlated to the detected (long afterglow) luminescence light emission intensity. It can for instance be the light intensity as such (e.g. measured in cd or lux), it can be an electrical signal of a detector or a signal converted therefrom, measured e.g. mJ, in Coulomb, mA or mV, or it can be the energy density of the emission on a given surface of the security marking in e.g. mJ/cm2. By referring to the luminescence light intensity, it is expressed that electromagnetic radiation from other sources than by luminescence of the afterglow compound present in the security marking is not included in the analysis or is properly considered, e.g. by a baseline subtraction, and such electromagnetic radiation is preferably excluded by a suitable device, such as a hood, cover or filter provided on or around the detector.

In the first step of the method of the present invention, for example according an embodiment corresponding to the above mentioned point 2 (for simplicity, we consider here that the first and second zones are identical), step a), a value of the detected luminescence light intensity for a first spectral component in the first wavelength region and a value of the detected luminescence light intensity for a second spectral component in the second wavelength region are determined "at an initial instant". This initial instant is generally any point in time after the long afterglow compound(s) present in the security marking received sufficient excitation radiation (e.g. from a light source to be described later, or from the environment) to induce long afterglow emission of the first spectral component in the first wavelength region and the second spectral component in the second wavelength region, until the respective intensity values of the detected luminescence light for the first and second spectral components fall, respectively, below a first and second threshold values in step b). In step c), a comparison is performed between said determined value of the luminescence light intensity for the first and second spectral components at the initial instant, and said determined values of the first and second long afterglow parameters, and corresponding first and second reference values (i.e. reference initial intensities of first and second spectral components and reference first and second long afterglow parameters). For each long afterglow compound present in the security marking, the reference values are representative of a reference concentration value of said long afterglow compound, i.e. these reference values characterize the very amount of said long afterglow compound in security marking (here, the overlapping first and second zones). Still in step c), it is decided that the security marking is genuine in case said determined values for the first and second spectral components are, respectively, within first and second ranges around said respectively corresponding first and second reference values. Thus, in this case, for each long afterglow compound present in the security marking, two measured initial intensity values are compared with two reference initial intensity values, and two measured long afterglow parameter values are compared with two reference long afterglow parameter values. This comparison operation can be performed in many different ways: a difference, or a ratio, can be calculated for each corresponding measured and reference values, separately, and for each calculated value it is then checked if it falls within a given range of admissible values for authentication. In this case, authentication decision involves four measured values, four reference values and four ranges of admissible values. Equivalently, instead of considering four ranges, a simpler criterion can be used for deciding on genuineness of a marking: for example, two ranges can be respectively used for the two measured initial intensities and a mere scalar value like a distance for example can be used for both long afterglow parameters and their respective reference values, the distance being less than a given positive value for genuineness. As another example of equivalent criterion for decision, a unique scalar value, like a distance, involving all the four measured and four reference values can be used (see above, the Euclidean distance for R and G channels), instead of the four given ranges. In fact, according to the invention, it is only necessary that the measured initial intensities and corresponding long afterglow parameters are "close enough" to their respective reference values, such closeness corresponding of course to admissible fluctuations around said reference values (preferably of less than 20%, more preferably less than 10% and even more preferably less than 5%).

Incidentally, the "initial instant" is a point in time where the sensor(s) used for detecting the long afterglow emission is/are not saturated, as this would affect the capability to correctly assess the afterglow time, respectively to measure correctly the time until the emission intensity falls below a pre-determined threshold value.

The "initial instant" may be a point in time during irradiation with excitation radiation, it is in preferred embodiment typically a point in time after irradiation with excitation radiation has ceased or excitation radiation has been cut off by e.g. a filter or hood, such as shown in FIG. 5. In this embodiment, the "initial instant" is preferably a point in time that is 100 ms to 10 s after excitation radiation has ceased or has been cut off, more preferably 200 ms to 5 s, further preferably 300 ms to 3 s. According to the invention, at step c) of the method, for deciding on authenticity, it is equivalent to consider intensity of each spectral component at a given time after the initial one (and before the corresponding afterglow time) instead of at the initial time, and of course, the same is true for the corresponding reference value (however this variant necessitates storing more intensity values).

The value of the long afterglow parameter of the detected luminescence light intensity for the spectral component in the given wavelength region is determined. Here, the value of the long afterglow parameter corresponds to an afterglow time that elapsed since the initial instant at which initial value of intensity of the detected luminescence light for the spectral component falls below a first threshold value being a predetermined fraction of the value of the detected luminescence light intensity (acquired from the relevant zone of the security marking) for the spectral component in the wavelength region.

The afterglow time is a time until the intensity value of the detected luminescence light for the considered spectral component falls below a predetermined threshold value, corresponding to a predetermined fraction value of initial intensity value of said detected luminescence light intensity for said spectral component. For instance, if the value of the measured initial luminescent light intensity of the (e.g. first) spectral component in the (respectively, first) wavelength region (e.g. corresponding to the green channel of a cell phone camera) was 80% of the maximum intensity that can be received by a detector, the afterglow time could be the time until the measured light intensity drops to the first threshold value that has been predetermined to be 50%, 40%, 30%, or 20% of the maximum intensity, and may for instance be 800 ms, 1500 ms or 2000 ms. This time depends, besides the decay characteristics of the afterglow compound(s), on the threshold (in fact, the fraction value) chosen and on the value of the detected luminescence light intensity determined in step a). Of course, other threshold values can be set for other in values of the light intensity detected in step a), and suitable threshold values and/or times can be suitably selected by a skilled person for any given afterglow compound or combination of afterglow compounds.

With regard to the afterglow time, while the time until a certain threshold (e.g. 20% of the maximum light intensity of the detector) is reached depends on factors such as e.g. the population saturation of radiation-emitting electronic states of the long afterglow compound, the concentration of the long afterglow compound in the analyzed area (zone) of the security marking, or the value of the detected luminescence light intensity for a spectral component measured at the initial instant in step a) in case the threshold value is not reliably measurable (i.e. within a noise region). Preferably, the threshold value should be chosen or adjusted such that the afterglow time is 50 ms or greater, preferably 100 ms or greater, further preferably 250 ms or greater. This can be achieved by adjusting the threshold value as explained above and/or ensuring a minimum excitation of the afterglow compound, e.g. by irradiating the security marking with electromagnetic radiation capable of exciting the afterglow compound to provide sufficient long afterglow emission.

Conversely, the threshold value and the value of the detected luminescence light intensity at the initial instant should not be chosen or adjusted such that very long afterglow times result, in particular if the method is intended to be implemented at a place of sale or control, e.g. of event tickets, where a quick decision on the authenticity of the marking is required. As such, the threshold value (or corresponding fraction value) and the value of the detected luminescence light intensity at the initial instant are preferably adjusted or set such that the afterglow time is 5 s or less, more preferably 3 s or less, and further preferably 2 s or less, and may be even be 1 s or less.

As set out above, the threshold value can also be set in accordance with the value of the detected luminescence light intensity in step a). This means that the predetermined threshold value can be set or adjusted to take into account both the requirements of a suitable afterglow time allowing a reasonably fast, but still reliable determination of the value of the long afterglow parameter, i.e. by adjusting the threshold value (fraction value) such that the afterglow time is in the range of 200-1500 ms, depending on the value of the detected luminescence light intensity in step a). If for instance the value of the detected luminescence light intensity is high (e.g. 90% of the maximum detector signal), the threshold may be set to 60% or 50% of the maximum detector signal. Conversely, if the value of the detected luminescence light intensity in step a) is relatively low (e.g. 30% of the maximum detector signal), the threshold may be set to a lower level of e.g. 15%.

The variability in the determined value of the detected luminescence light intensity in step a) may be caused by various factors, such as by different saturation levels of the afterglow compound, differences between users regarding the intensity and duration of illumination excitation light prior to step a) (if employed), different conditions with respect to the shut-off or exclusion of ambient (stray) light, different sensitivities of the testing equipment (e.g. cell phones with cameras of different sensitivities or spectral resolutions) etc. If, depending on the sensitivity of the equipment and of low value of the detected luminescence light intensity in step a) at the initial instant, this leads to problems in the reliable determination of the afterglow time (and thus of long afterglow parameter), the device implementing the method of the invention may issue an error warning and/or show a message telling the use to take measures that are suitable for increasing the absolute value of the detected luminescence light intensity in step a) at the initial instant, such as telling the user to irradiate the security mark for a longer time to increase the population of the excited afterglow emission states of the afterglow compound.

As set out above, the value of the long afterglow parameter corresponds to an afterglow time. This means that the value of the long afterglow parameter can be the afterglow time as such, but the value of the afterglow parameter can also be a value that is directly and unambiguously correlated to the afterglow time by a known mathematical operation. For example, if the afterglow time is x seconds, the afterglow parameter may be x, may be 100 x, or may be 1/x. For an afterglow parameter of 1/x and an afterglow time of 2 s, the value of the long afterglow parameter is 0.5 $s^{-1}$.

In step c), an authentication operation is performed that comprises comparing said determined value(s) of the respective luminescence light intensities for spectral component(s) at the initial instant, said determined value of the long afterglow parameter(s) with corresponding reference values, and deciding that the security marking is genuine in case said determined value(s) are close enough to the corresponding reference values, i.e. in case said determined value(s) are within a range around the corresponding reference values. This authentication operation delivers a result as to whether the security marking is authentic or not.

As an example, the result "authentic" is obtained if the values are close enough to expected predetermined reference values, within a margin of error of e.g. 10%. If a multi- (i.e.n-) dimensional operation is performed, this may also be regarded as an n-dimensional space that defines the expected range of results/values for an authentic marking.

As the measurement of the light intensities leading to the values determined in steps a) and b) is subject to certain variations, e.g. due to different detectors (cameras), different handling by the user, and possibly also variations in the design and distribution of the afterglow compound in the security marking, it is necessary to allow for some variation to the expected reference value, which has beforehand been established for a surely authentic security marking. The variation from the expected value can be in the range of +/−10% or +/−5%. Higher variations may be allowed for simple equipment or place of authentication with poor conditions, and lower variations may be allowed under controlled conditions or equipment having better spectral and/or temporal resolution properties, giving more reliable authentication result.

In view of the above, it is obvious that the security marking must be capable of emitting long afterglow luminescence light of any used spectral component in corresponding wavelength region, and the value(s) of the long afterglow parameter(s) obtained for the respective spectral component(s) are then used to obtain a decision whether the marking is authentic.

As outlined above, the method of the present invention relies inter alia on the values of the long afterglow parameter(s) and corresponding initial light intensities observed for spectral component(s) in wavelength region(s), such as—in a simple illustrating case—the luminescence light intensity values observed in different channels (R,G,B) of a (cell phone or tablet) camera. In this respect, it is possible to use only one afterglow compound in the marking capable of emitting long afterglow luminescence light, this long afterglow luminescence light forming both the first spectral component in the first wavelength region (one of the channels), the second spectral component of the second wavelength region (another channel) and the third spectral component of the third wavelength region (i.e. the remaining channel).

In a preferred aspect, the security marking however comprises two or more long afterglow compounds, one of the two or more long afterglow compounds being capable of emitting long afterglow luminescence light forming the first spectral component in the first wavelength region (e.g. one channel of R, G, B of a camera), and a second long afterglow compound being capable of emitting afterglow luminescence light forming the second spectral component in the second wavelength region (e.g. another one of the R, G, B channels of a camera). In this case, the security marking may comprise the two or more afterglow compounds in the same area (zone) of the security marking to form a mixture, whereas it may also comprise the two or more long afterglow compounds in different zones that are arranged randomly or in a specific pattern, such as to form (part of) a logo, a code (such as a barcode or QR code), indicia, letters, or other graphical elements. As long as the luminescence light detector can detect both emissions simultaneously in different wavelength regions (different channels), the method of the present invention can be utilized for both a mixture of two or more afterglow compounds in the same spatial area (zone) of a security marking or for two or more long afterglow compounds present in different spatial areas (zones) of the security marking.

DESCRIPTION OF SPECIFIC AND PREFERRED EMBODIMENTS

In one embodiment, the security marking is capable of emitting long afterglow luminescence light in a third wavelength region different from a first wavelength region and a second wavelength region (see above the method according to point 3).

Preferably in this embodiment, the third spectral component is in a third wavelength region that is different from each one of the first and second wavelength regions, and wherein the wavelength region extending to longest wavelengths does not overlap or only overlaps with one of the two other wavelengths regions, and wherein the wavelength region extending to shortest wavelengths does not overlap or only overlaps with one of the two other wavelengths regions. Further preferably, additionally or alternatively, the three wavelength regions are all within the visible range, and even further preferably the first, second and third wavelength region represent different channels of a camera, e.g. R, G and B.

In this embodiment utilizing a value of a long afterglow parameter based on long afterglow emission in a third wavelength region in addition to one or more of the values of the afterglow parameters in the first and second wavelength regions, it becomes possible to increase the reliability and robustness of the method. Also, a potential counterfeiter not only needs to mimic the afterglow behavior and the values of afterglow parameters for two spectral components, but for three spectral components. This is more difficult to achieve, and hence this embodiment provides an additional level of protection. Put differently, by utilizing three long afterglow compounds in the method of the present invention, variability is reduced and complexity for a counterfeiter is strongly increased.

In this embodiment, the security marking may comprise (A) one afterglow compound emitting the all of the first, second or third wavelength regions, it may comprise (B) two afterglow compounds, one of which emits in two of the first, second and third wavelength region and one of which emits in another wavelength region in which the other one does not emit, or it may comprise (C) one afterglow compound emitting afterglow luminescence in only the first wavelength region, one afterglow compound emitting afterglow luminescence in only the second wavelength region, and one afterglow compound emitting afterglow luminescence in only the third wavelength region. Cases (B) and (C) are preferred, and case (C) is more preferred.

The method for authenticating a security marking according to the invention or according to the embodiment above can preferably be employed for authenticating a marking capable of emitting afterglow luminescence with one peak forming the first spectral component in the first wavelength region, one peak forming the second spectral component in the second wavelength region, and, if employed, one peak forming the third spectral component in the third wavelength region. Herein, the respective peaks of the first and second spectral component are 100 nm or more separated in terms of wavelength, and preferably the first maximum peak of the first spectral component falls within a first wavelength region that is selected from a) 400-550 nm, b) 460 to 600 nm, or c) 560 to 700 nm, and the second maximum peak in the second wavelength region falls in another wavelength region selected from the regions a), b) and c). If a third spectral component is utilized, it is preferable that a first of the first, second and third spectral component falls in the wavelength region a), a second of the first, second and third spectral component falls within the wavelength region b), and a third of the first, second and third spectral component falls in the wavelength region c). In such an arrangement, the peaks forming the first, second and third spectral component fall into different wavelength ranges that form the channels of a camera R, G, B, which ensures their proper detection and reliable determination of the respective values of the afterglow parameters.

In a particular preferred embodiment, the method is implemented in a handheld computing device equipped with a camera, which is preferably a telecommunication device or a tablet. Examples are smartphones such as an iPhone 5 or Samsung Galaxy S5, or tablets such as an iPad 2 or Samsung Galaxy Tab. In such devices, a computer program ("app") may be installed that performs the steps recited in claims 1 and 2 automatically. The app may also activate the LED of the computing device to allow emission of electromagnetic radiation that is used for exciting the at least one afterglow compound to emit afterglow luminescence. This activation may be set to a specific time, such as in the range of 0.2 to 5 seconds in order in to provide a minimum saturation of the afterglow emissive states of the afterglow compound, to thereby increase the reliability of the determination of the value of the afterglow parameters within a desired time frame of e.g. up to 5 seconds during which the steps of the method of the present invention are performed. The app may also have certain predetermined reference values stored, or these may be obtained by remote access (e.g. via internet) to a database providing predetermined reference values. Further, the app may provide a visible and/or audible signal relating to the result of the authentication operation, e.g. a green screen with a checked box for a positive authentication and a red screen with cross for a negative authentication (non-genuine security marking). Corresponding audio signals may alternatively or additionally be triggered based on the result of the authentication operation.

The method may be implemented in a handheld computing device without the use of any additional equipment. Yet, in order to avoid disturbances by ambient light, also a hood or cover may be employed in order to reduce or prevent ambient light from entering the camera of the handheld device. This improves the reliability of the method even further.

The first, second and optionally third value of the first, second and optionally third afterglow parameters are determined for the same or, if more than one afterglow compound is used, possibly for different areas of the security marking. This means that the afterglow compounds do not need to be present in the same area, as long as their afterglow emission can be detected by the detector (camera). While in some cases it may be preferable to analyze only one area for reasons of simplicity, providing two or more afterglow compounds in different areas of the security marking allows obtaining interesting designs appealing to a user, such as a letter code with differently colored letters. Also, different elements of e.g. a logo can be provided with different afterglow compounds, which may confer an impression of value and exclusivity to a product. The security marking employed in the present invention thus also has the advantage of being able to provide an aesthetic impression, which is an advantage over e.g. barcodes or QR codes.

The method of the present invention may also be implemented by analyzing only certain portions of a security marking relative to a reference point, such as in a QR code. For instance, only parts of a QR code or other logo or symbol may be provided with the one or more afterglow compounds, and other parts could be held in a different colour or be provided with compounds providing a similar appearance and afterglow effect to the unaided eye, yet which can easily by identified as not being close enough to the expected reference values in the authentication step. Such an arrangement provides an additional challenge for any counterfeiter, as not only the afterglow effect needs to be mimicked, but also the spatial arrangement of the area in which this effect needs to be observed. The requirement regarding the spatial arrangement of the area of the security marking providing the afterglow effect can hence be used to increase the security level by providing an additional authenticity criterion, and may be implemented as part of the authenticity criterion, e.g. in the app installed on a handheld computing device. Hence, the spatial relationship between at least a part of areas for which the afterglow parameter values can be determined is implemented as an authenticity criterion in the authentication operation.

As outlined above, the method of the present invention may further comprise comprises a step of irradiating the security marking with excitation light prior to or simultaneous with step a), and additionally (i) a filter for excluding or reducing detection of the excitation light in the first and second wavelength region is used, and/or (ii) the excitation light does not substantially comprise light with a wavelength falling within the first and second wavelength region. Thereby, a suitable population of the emissive electronic states of the one or more afterglow compounds is secured, and further any disturbance of the detection due to excitation light can be avoided.

In the following, specific embodiments of the present invention will be described with reference to the appended figures. The present invention is however not limited to these specific embodiments.

In one embodiment, the authentication method comprises exciting the mark with a white LED of a handheld computing device such as a cell phone or table, discontinuing excitation and detecting the afterglow time. Thereby, the value of the long afterglow parameter can be determined.

Figure 1:
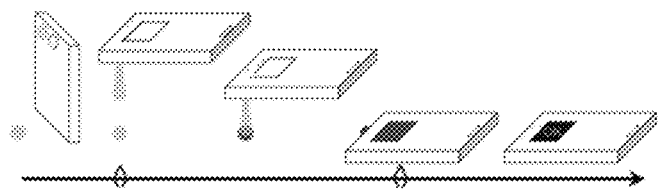
FIG. 1 is a schematic representation illustrating one embodiment of the authentication method of the present invention implemented in a smartphone, wherein the security marking is present in a product label. The figure shows the following steps from left to right: The smartphone approaches the security marking. After switching the LED on, the security marking is irradiated while the camera observes the security marking. The irradiation then provides excitation energy for initiating or strengthening the long afterglow emission. The LED is switched off, and the smartphone camera observes the long afterglow emission on at least two channels of the camera selected from R, G and B (i.e. Red, Green and Blue channels, respectively of a light intensity sensor of the camera). After performing the authentication operation, the smartphone provides an audible and/or visible signal (in this case "OK") that indicates the result of the authentication operation.

During excitation, the computing device can analyse the preview of the camera. When the region of interest of the security marking reaches an intensity threshold, the app turns off the white LED (excitation). At the following initial instant, intensity values of the detected luminescent light intensity of the respective spectral components in at least two or all three of the R, G and B channels (corresponding to the first, second and optionally third wavelength region) are determined, and a relative intensity value between the detected luminescent light intensities is calculated (e.g. [intensity value on the R channel]/[intensity on the G channel]). Then, the emission is monitored, and it is determined when the observed intensity values for the spectral component in the respective wavelength regions respectively fall below a predetermined threshold value, such as to determine the afterglow parameter values from this afterglow time. The afterglow parameter values are then compared to an expected, predetermined reference value in the authentication step. Provided that the obtained values are identical or sufficiently close to expected predetermined reference values, the computing device gives a positive result such as "OK", or otherwise gives a negative result such as "FALSE". See FIG. 1.

In another embodiment, the authentication method comprises providing the handheld computing device in contact with the security marking with the white LED turned on, moving the computing device from point A to point B, where A corresponds to a point where the camera is once the computing device is in contact with the security marking, and B is the point where the white LED excited the mark sufficiently. In a specific embodiment, an accelerometer of the computing device may be involved, such as to turn off the white LED when the translation movement has started.

In another embodiment, the authentication method comprises placing a camera hood on the security marking and placing the camera of the computing device on the camera hood. Then, steps a)-c) of claim 1 are performed.

If an optional colour filter is used, the luminescence/radiation before the excitation, during the excitation and after the excitation can be measured. The hood may be used to ensure the sealing between the computing device and a security marking that is deposited on a specific product shape, for example a label on a cigarette pack for a flat surface or for example label on a bottle neck for curved surfaces.

In another embodiment, the security marking may be semi-covert by providing an ink containing two long afterglow compounds, and wherein significantly more of one long afterglow compound is present compared to the other (e.g. in a ratio of 10:1 to 5:1). The naked eye of an observer will mainly or only perceive the afterglow of the afterglow compound present in excess (i.e. in one wavelength region), while the camera will analyse the luminescent afterglow emission for both afterglow compounds in two wavelength regions, e.g. on two channels of a camera. Such an arrangement is particularly efficient if the dominant emission by the afterglow compound present in excess is a spectral component in the green wavelength region and the emission by the afterglow compound present in a smaller proportion is a spectral component in the red wavelength region, but the opposite arrangement is also contemplated. However, in the case of the red as dominant colour, it has been identified that the quantity of the red must be much higher than the green, to "mask" the green. This semi-covert feature can be considered as one marker masking the other, where masking is obtained for the naked eye, but not for an RGB camera.

However, ambient light (environmental factor) may influence the result. It is thus preferred to suppress the ambient light to measure reproducible afterglow times.

In order to eliminate or reduce the influence of ambient light, the following two methods may be contemplated 1) placing the camera in contact with the mark 2) using a camera hood to block the ambient light that can excite the sample or be detected by the RGB camera, as illustrated in FIG. 5.

In the above example using a green and a red afterglow compound as illustrated in FIG. 4, ideally, the concentration of the green pigment preferably does not exceed 15% in mass and the concentration of the red pigment preferably does not exceed 30%. In case the red pigment concentration does not exceed 15% and the green pigment concentration does not exceed 65, it has been observed that the long afterglow emission intensity of the green pigment is only measured on the green channel, and the long afterglow emission intensity of the red pigment is only measured on the red channel of the RGB camera. For example, if the concentration of the green pigment is about 10%, then a contribution of the afterglow coming from this green pigment can also be detected on the red channel. If the concentration of the red pigment is about 30%, then a contribution of the afterglow coming from this red pigment can also be detected on the green channel.

Figure 2:
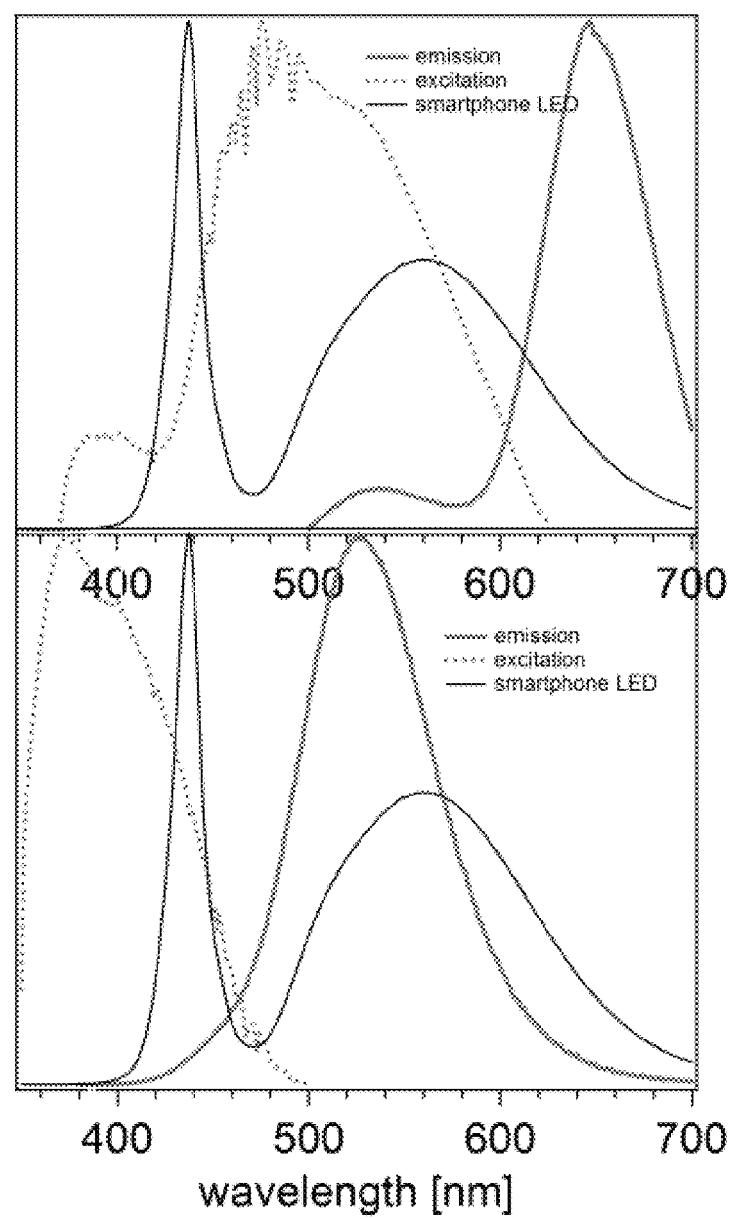
FIG. 2 shows the overlap between the light emission intensity of a smartphone illumination LED (i.e. "Light Emitting Diode", identical in the upper and lower part) and the excitation and emission spectra for two long afterglow pigments (top: red emitting pigment; bottom: green emitting pigment) in one embodiment of a security marking useful for the authentication method of the present invention.

The marking employed in the method of the present invention preferably satisfies the following criteria:

1) The marking is excitable with the white light essentially not containing any wavelengths outside the visible range (e.g. a white LED of a cell phone). This implies that the while light excitation (e.g. emission of the white LED) has to overlap with the excitation wavelengths of the at least one afterglow compound (see FIG. 2), 2) the marking emits afterglow luminescent light in the visible range (400-700 nm), and 3) the marking shows an afterglow time of at least 0.5 seconds and up to 5 seconds second upon white light excitation.

Moreover, combining two or more afterglow compounds in different relative amounts provides, for each relative amount, a specific radiation temporal profile in the respective wavelength regions, e.g. on R, G and B channels of a cell phone camera For example, in one embodiment a mixture with a certain relative amount of an afterglow compound having a relatively short afterglow time of emission that is detected by a blue channel of a camera and with a certain relative amount of an afterglow compound having a relatively long afterglow time of emission that is detected by the R channel allows obtaining a specific set or relationship of afterglow time parameter values. This is due to the fact that the afterglow time is the time until the intensity value of the radiation falls below a certain threshold intensity value, and this is influenced by the relative amounts of the afterglow compounds (a compound that is present in excess will lead to a more intense emission as compared to a compound that is present in a small proportion). Hence, if two or more afterglow compounds are present in the security marking and also utilized in the method of the present invention, their relation not only depends on the chemical nature of the afterglow compounds, but also on their relative amounts. This allows creating a specific emission profile for authentication purposes that is very difficult to reverse engineer, and thus provides an additional level of security.

This is also illustrated in FIG. 4, which shows different afterglow curves for different relative amounts of the same components. Consequently, with the same 2 afterglow compounds, it is possible to create several different keys (FIG. 4). By using several different combinations of afterglow compounds, a broad range of different "keys" can be generated. Each combination of specific compounds leads to a very specific set of values that can then be exploited in the authentication operation.

Moreover, the match or overlap between the spectral components, respectively the wavelength regions in which afterglow luminescence is observed, and the spectral sensitivities of the R, G and B channels, respectively, are directly related to the afterglow time determined on the different channels. This parameter is also important for creating multiple keys. In FIG. 3, there are presented examples of markings containing two different afterglow compounds that provide different afterglow luminescence in wavelength regions that correspond to different channels (R/G, or G/B, or R/B or R/(G/B)). For example, in order to have a complex signal that is difficult to reproduce, the marking preferably contains at least two markers with afterglow emission in different wavelength regions corresponding to different channels of the camera. For example, one afterglow compound has a green broad band emission centered at about 530 nm and a second marker with a red broad band emission centered at about 650 nm) (FIG. 3 top right). Preferably, the two or more afterglow compounds show different decay characteristics.

In the embodiment above, the spectral components of the two or more long afterglow compounds are in wavelength regions that correspond to different channels of a camera, allowing easy implementation of the method of the invention in a handheld computing device. In another embodiment, the use of two compounds emitting in overlapping wavelength regions is contemplated. One example is a combination of two afterglow compounds emitting, with different decay characteristics, in the same wavelength region (e.g. green). This will lead to a value of the afterglow parameter that is basically the sum of the two emissions, which in turn depends on the relative amounts and the decay characteristics of the two compounds. Such a behavior cannot be mimicked by single compound, and for reverse-engineering exact knowledge about the compounds employed and their exact ratio is required, even in cases where the emissions of two or more afterglow compounds are not resolved or detected separately in the authentication method.

In a preferred embodiment, the method of the present invention is implemented in a computing handheld device, e.g. a modern cell phone ("smartphone") or tablet, which is equipped with software ("app") that implements the method of the invention. In practice, the computing device collects the data, analyses it and performs the authentication operation, which comprises comparing the obtained values to predetermined reference values. The reference values may be stored in the memory of the computing device, and may be part of the app itself, or can be obtained remotely (i.e. via internet) If the tested marking gives a value that is close enough to the reference values the application return a message that the mark is genuine, if the ratio is out of the targeted range, the application returns a message that the mark is false (see also FIG. 5).

Thus, the method for authenticating a security marking according to any one of the above mentioned points 1 to 3, for this embodiment is implemented in a reader equipped with a camera capable to detect said long afterglow luminescence light emitted by the security marking, and equipped with a software, stored in a memory of the reader together with reference values representative of a reference concentration value of said at least one long afterglow compound in said security marking, the software being operable to implement the steps of the method when running on a CPU unit of the reader.

Accordingly, the invention also concerns a reader having a CPU unit and a memory and being equipped with a software for implementing the above method (according to point 4), the reader comprising a camera capable to detect said long afterglow luminescence light emitted by the security marking, said software stored in the memory being operable to implement the steps of the method when running on the CPU unit, said reader being preferably a handheld computing device and more preferably a telecommunication device or a tablet. This reader being preferably a cell phone, that is equipped with a light source, which is preferably a LED, capable of delivering excitation light to cause said at least one long afterglow compound of the security marking to emit said long afterglow luminescence light, the reader being operable to illuminate the security marking with excitation light by means of the light source, wherein said software, when running on the CPU unit of the reader, is capable of executing a preliminary step of illuminating the security marking with excitation light by means of the light source.

In one embodiment, the smartphone collects the data and sends it to a server. Optionally, a response from the server may be implemented in the authentication method.

The authentication may also involve a cross-check with other security features or product-specific properties. For instance, a product having a marking to be authenticated may also be equipped with a product- or item-specific code, such as a serial number, a bar code or a QR code. This allows obtaining a higher level of security, as then the values obtained in the method of the invention may additionally be cross-checked with this product- or item-specific code. For instance, two or more batches of a product may be identified by corresponding different two or more QR codes and corresponding two or more security markings of the present invention. The security markings may then be designed such as to give the same or similar optical appearance to the unaided eye, but give rise to different values of e.g. the afterglow parameter. The obtained values from a given marking may then not only be compared to a predetermined reference value, but may also be related to the presence of the correct QR code. This allows implementing a product- or batch-specific authentication system.

Of course, such a product- or item-specific authentication may also be present in the security marking as such. That is, while the security marking can take the form of an area print, symbol, graphical element, logo or letter, it may also take the form of a code or product information, such as bar code or QR code. Of course, the marking may constitute such a code completely, or may form only parts thereof.

In one embodiment, the marking contains black and white regions in addition to one or more area designed to provide the afterglow effect. The black and white regions may then be used to normalize or calibrate the values of the detected luminescence light intensity, thereby taking into account of or eliminating radiation that is not afterglow luminescence.

The method of the present invention can be put into practice by using a security marking that contains at least one, but preferably two or more afterglow compounds.

Additionally, in some embodiments marking can contain further luminescent or non-luminescent colorants, and in some embodiments it may be preferred to employ fluorescent compounds, such as organic dyes, to modify the radiation profile during white LED excitation and to simultaneously provide an overt security feature that can be confirmed by the naked eye.

Thus, according to an embodiment of the invention, the method for authenticating a security marking according to any one of points 1 to 3, is a method wherein steps a) and b) of the method are implemented in a reader equipped with communication means and operable to send data via a communication link to a server having a server CPU unit and a database storing said reference values representative of a reference concentration value of said at least one long afterglow compound, the reader being further equipped with a camera capable to detect said long afterglow luminescence light emitted by the security marking, and equipped with a software stored in a memory of the reader and operable to execute said steps a) and b) of the method when running on a CPU unit of the reader;

wherein, upon completion of steps a) and b) of the method, the reader sends to the server via the communication link said determined values of detected luminescence light intensity and said determined values of long afterglow parameter; and the server CPU unit performs a comparison, according to step c) of the method, of the determined values received from the reader with corresponding reference values representative of a reference concentration value of said at least one long afterglow compound stored in the database, and decides that the security marking is genuine based on a result of the comparison.

In a variant, the method for authenticating a security marking according to point 4 or point 5, uses a reader equipped with a light source, which is preferably a LED, capable of delivering excitation light to cause said at least one long afterglow compound of the security marking to emit said long afterglow luminescence light, the method, when running on the CPU unit of the reader, comprising a preliminary step of illuminating the security marking with excitation light by means of the light source. Said wavelength regions of the long afterglow luminescence light emitted by the security marking can at least partially in the visible range, said camera then comprises a RGB diode, said light source is then a white LED and the long afterglow luminescence light in the first wavelength region is then detected on a first channel selected from R, G and B of the camera. In a variant of this embodiment, the long afterglow luminescence light in the second wavelength region is detected on a second channel selected from R, G and B of the camera that is different from the first channel. In a further variant, the long afterglow luminescence light in the third wavelength region is detected on a third channel selected from R, G and B of the camera that is different from the first and second channels.

Accordingly, the invention also relates to a reader having a CPU unit, a memory and being equipped with a software stored in the memory operable to implement steps a) and b) of the method according to any one of points 1 to 3 when running on the CPU unit, the reader comprising a camera capable to detect said long afterglow luminescence light emitted by the security marking; the reader being equipped with communication means operable to send data to a server via a communication link; the reader, upon completion of steps a) and b) of the method, being operable to send to the server via the communication link said determined values of detected luminescence light intensity and said determined values of long afterglow parameter; said reader being preferably a handheld computing device and more preferably a telecommunication device or a tablet. In a variant, the reader according to claim 14, being preferably a cell phone, that is equipped with a light source, which is preferably a LED, capable of delivering excitation light to cause said at least one long afterglow compound of the security marking to emit said long afterglow luminescence light, the reader being operable to illuminate the security marking with excitation light by means of the light source, wherein said software, when running on the CPU unit of the reader, is capable of executing a preliminary step of illuminating the security marking with excitation light by means of the light source.

In a variant, the reader allows detecting long afterglow luminescence from a security marking for which said wavelength regions are at least partially in the visible range, and said camera comprises a RGB diode, said light source is a white LED and wherein the camera is capable of detecting the long afterglow luminescence light in the first wavelength region on a first channel selected from R, G and B. Optionally, the camera is capable of detecting the long afterglow luminescence light in the second wavelength region on a second channel selected from R, G and B that is different from the first channel. The camera can further be capable of detecting the long afterglow luminescence light in the third wavelength region on a third channel selected from R, G and B that is different from the first and second channels.

While in the above the implementation in a handheld computing device has been described, it needs to be noted that the method of the invention can also be put into practice with more sophisticated equipment, e.g. comprising a higher sensitivity detection tool or higher frame rate, to lower the impact of the environment conditions on the variability of the measurement (using e.g. user-independent white LED excitation and high resolution camera detection in a controlled environment/optical lab) This allows a more in-depth analysis of the detected radiation profile-time evolution (persistent phosphorescence intensity time-evolution), which has a specific behavior that comprises a fast and a slow luminescence deactivation contribution (double exponential, illustrated in FIGS. 5 and 6).

The invention also comprises a system for authenticating a security marking designed to provide a long afterglow effect and comprising at least one long afterglow compound, the security marking being capable of emitting long afterglow luminescence light, the system being operable to implement the steps of the method according to any one of claims 1 to 3, the system comprising: a server having a server CPU unit and a database storing said reference values representative of a reference concentration value of said at least one long afterglow compound; and a reader equipped with a CPU unit, a memory and a camera capable to detect said long afterglow luminescence light emitted by the security marking, and equipped with a software stored in the memory and operable to implement steps a) and b) of the method when running on the CPU unit, the reader being equipped with communication means operable to send to the server via a communication link said determined values of detected luminescence light intensity and said determined values of long afterglow parameter resulting from completion of steps a) and b) of the method;

wherein the server CPU unit is capable to perform a comparison, according to step c) of the method, of the determined values received from the reader with corresponding reference values representative of a reference concentration value of said at least one long afterglow compound stored in the database, and decide that the security marking is genuine based on a result of the comparison. This system has preferably a reader equipped with a light source, which is preferably a LED, capable of delivering excitation light to cause said at least one long afterglow compound of the security marking to emit said long afterglow luminescence light, and the software is capable, when running on the CPU unit of the reader, to execute a preliminary step of illuminating the security marking with excitation light by means of the light source of the reader.

In a variant wherein said wavelength regions of the long afterglow luminescence light emitted by the security marking being at least partially in the visible range, said camera comprises a RGB diode, said light source is a white LED and wherein the camera is capable of detecting the long afterglow luminescence light in the first wavelength region on a first channel selected from R, G and B. The camera can be capable of detecting the long afterglow luminescence light in the second wavelength region on a second channel selected from R, G and B that is different from the first channel. Optionally, the camera is capable of detecting the long afterglow luminescence light in the third wavelength region on a third channel selected from R, G and B that is different from the first and second channels.

The invention claimed is:

1. A method for authenticating a security marking designed to provide a long afterglow effect and comprising at least one long afterglow phosphorescent pigment, the security marking being capable of emitting long afterglow luminescence light in a first wavelength region and said method comprising detecting said long afterglow luminescence light emitted from a first zone of the security marking in said first wavelength region, wherein the method comprises the steps of:
   a) determining a value of the detected luminescence light intensity from said first zone for a first spectral component in the first wavelength region at an initial instant;
   b) determining a value of a first long afterglow parameter of the luminescence light intensity from the first zone for the first spectral component in the first wavelength region detected at step a), said value of the first long afterglow parameter corresponding to a first afterglow time elapsed since the initial instant, said first afterglow time being a time until the intensity value of the detected luminescence light for the first spectral component falls below a first threshold value being a predetermined fraction of the value of the detected luminescence light intensity from the first zone for the first spectral component in the first wavelength region determined at step a); and
   c) following completion of steps a) and b), performing an authentication operation that comprises comparing said determined value of the luminescence light intensity for the first spectral component at the initial instant, said determined value of the first long afterglow parameter with corresponding first reference values representative of a reference concentration value of said at least one long afterglow phosphorescent pigment in said first zone of the security marking, and deciding that the security marking is genuine in case said determined values are within a first range around the corresponding first reference values.

2. The method for authenticating a security marking according to claim 1, wherein the security marking is further capable of emitting long afterglow luminescence light in a second wavelength region and said method comprises detecting said afterglow luminescence light emitted from a second zone of the security marking in said second wavelength region, wherein:
   step a) further comprises determining a value of the detected luminescence light intensity from said second zone for a second spectral component in the second wavelength region at initial instant;
   step b) further comprises determining a value of a second long afterglow parameter of the luminescence light intensity from the second zone for the second spectral component in the second wavelength region detected at step a), said value of the second long afterglow parameter corresponding to a second afterglow time elapsed since the initial instant, said second afterglow time being a time until the intensity value of the detected luminescence light for the second spectral component falls below a second threshold value being a predetermined fraction of the value of the detected luminescence light intensity from said second zone for the second spectral component in the second wavelength region determined at step a); and
   step c) comprises performing said authentication operation by further comparing said determined value of the luminescence light intensity for the second spectral component at the initial instant, said determined value of the second long afterglow parameter with corresponding second reference values representative of a reference concentration value of said at least one long afterglow phosphorescent pigment in said second zone of the security marking, and deciding that the security marking is genuine in case said further determined values are within a second range around said corresponding second reference values.

3. The method for authenticating a security marking according to claim 2, wherein the security marking is further capable of emitting long afterglow luminescence light in a third wavelength region and said method comprises detecting said afterglow luminescence light emitted from a third zone of the security marking in said third wavelength region, wherein:
   step a) further comprises determining a value of the detected luminescence light intensity from said third zone for a third spectral component in the third wavelength region at initial instant;
   step b) further comprises determining a value of a third long afterglow parameter of the luminescence light intensity from the third zone for the third spectral component in the third wavelength region detected at step a), said value of the third long afterglow parameter corresponding to a third afterglow time elapsed since the initial instant, said second afterglow time being a time until the intensity value of the detected luminescence light for the third spectral component falls below a third threshold value being a predetermined fraction of the value of the detected luminescence light intensity from said third zone for the third spectral component in the third wavelength region determined at step a); and
   step c) comprises performing said authentication operation by further comparing said determined value of the luminescence light intensity for the third spectral component at the initial instant, said determined value of the third long afterglow parameter with corresponding third reference values representative of a reference concentration value of said at least one long afterglow phosphorescent pigment in said third zone of the security marking, and deciding that the security marking is genuine in case said further determined values are within a third range around said corresponding third reference values.

4. The method for authenticating a security marking according to claim 1, wherein the method is implemented in a reader equipped with a camera capable to detect said long afterglow luminescence light emitted by the security marking, and equipped with a software, stored in a memory of the reader together with reference values representative of a reference concentration value of said at least one long afterglow phosphorescent pigment in said security marking, the software being operable to implement the steps of the method when running on a CPU unit of the reader.

5. The method for authenticating a security marking according to claim 4, wherein the reader is equipped with a light source, capable of delivering excitation light to cause said at least one long afterglow phosphorescent pigment of the security marking to emit said long afterglow luminescence light, the method, when running on the CPU unit of the reader, comprising a preliminary step of illuminating the security marking with excitation light by means of the light source.

6. The method for authenticating a security marking according to claim 5, wherein said wavelength regions of the long afterglow luminescence light emitted by the security marking are at least partially in the visible range, said camera comprises a RGB diode, said light source is a white LED and wherein the long afterglow luminescence light in the first wavelength region is detected on a first channel selected from R, G and B of the camera.

7. The method for authenticating a security marking according to claim 6, wherein the long afterglow luminescence light in the second wavelength region is detected on a second channel selected from R, G and B of the camera that is different from the first channel.

8. The method for authenticating a security marking according to claim 7, wherein the long afterglow luminescence light in the third wavelength region is detected on a third channel selected from R, G and B of the camera that is different from the first and second channels.

9. A reader having a CPU unit and a memory and being equipped with a software for implementing the method according to claim 4, the reader comprising a camera capable to detect said long afterglow luminescence light emitted by the security marking, said software stored in the memory being operable to implement the steps of the method when running on the CPU unit.

10. The reader according to claim 9, equipped with a light source, capable of delivering excitation light to cause said at least one long afterglow phosphorescent pigment of the security marking to emit said long afterglow luminescence light, the reader being operable to illuminate the security marking with excitation light by means of the light source, wherein said software, when running on the CPU unit of the reader, is capable of executing a preliminary step of illuminating the security marking with excitation light by means of the light source.

11. The method for authenticating a security marking according to claim 1, wherein steps a) and b) of the method are implemented in a reader equipped with communication means and operable to send data via a communication link to a server having a server CPU unit and a database storing said reference values representative of a reference concentration value of said at least one long afterglow phosphorescent pigment, the reader being further equipped with a camera capable to detect said long afterglow luminescence light emitted by the security marking, and equipped with a software stored in a memory of the reader and operable to execute said steps a) and b) of the method when running on a CPU unit of the reader;

wherein, upon completion of steps a) and b) of the method, the reader sends to the server via the communication link said determined values of detected luminescence light intensity and said determined values of long afterglow parameter; and the server CPU unit performs a comparison, according to step c) of the method, of the determined values received from the reader with corresponding reference values representative of a reference concentration value of said at least one long afterglow phosphorescent pigment stored in the database, and decides that the security marking is genuine based on a result of the comparison.

12. A reader having a CPU unit, a memory and being equipped with a software stored in the memory operable to implement steps a) and b) of the method according to claim 11 when running on the CPU unit, the reader comprising a camera capable to detect said long afterglow luminescence light emitted by the security marking; the reader being equipped with communication means operable to send data to a server via a communication link; the reader, upon completion of steps a) and b) of the method, being operable to send to the server via the communication link said determined values of detected luminescence light intensity and said determined values of long afterglow parameter.

13. The reader according to claim 12, equipped with a light source, capable of delivering excitation light to cause said at least one long afterglow phosphorescent pigment of the security marking to emit said long afterglow luminescence light, the reader being operable to illuminate the security marking with excitation light by means of the light source, wherein said software, when running on the CPU unit of the reader, is capable of executing a preliminary step of illuminating the security marking with excitation light by means of the light source.

14. The reader according to claim 13, for detecting long afterglow luminescence from a security marking for which said wavelength regions are at least partially in the visible range, wherein said camera comprises a RGB diode, said light source is a white LED and wherein the camera is capable of detecting the long afterglow luminescence light in the first wavelength region on a first channel selected from R, G and B.

15. The reader according to claim 14, wherein the camera is capable of detecting the long afterglow luminescence light in the second wavelength region on a second channel selected from R, G and B that is different from the first channel.

16. The reader according to claim 15, wherein the camera is capable of detecting the long afterglow luminescence light in the third wavelength region on a third channel selected from R, G and B that is different from the first and second channels.

17. The method for authenticating a security marking according to claim 1, wherein the first zone, optionally the second zone and further optionally the third zone are the same or are distinct.

18. A security marking designed to provide a long afterglow effect and comprising at least one long afterglow phosphorescent pigment, adapted for being authenticated by the method according to claim 1.

19. A system for authenticating a security marking designed to provide a long afterglow effect and comprising at least one long afterglow phosphorescent pigment, the security marking being capable of emitting long afterglow luminescence light, the system being operable to implement the steps of the method according to claim 1, the system comprising:
- a server having a server CPU unit and a database storing said reference values representative of a reference concentration value of said at least one long afterglow phosphorescent pigment; and
- a reader equipped with a CPU unit, a memory and a camera capable to detect said long afterglow luminescence light emitted by the security marking, and equipped with a software stored in the memory and operable to implement steps a) and b) of the method when running on the CPU unit, the reader being equipped with communication means operable to send to the server via a communication link said determined values of detected luminescence light intensity and said determined values of long afterglow parameter resulting from completion of steps a) and b) of the method;

wherein the server CPU unit is capable to perform a comparison, according to step c) of the method, of the determined values received from the reader with corresponding reference values representative of a reference concentration value of said at least one long afterglow phosphorescent pigment stored in the database, and decide that the security marking is genuine based on a result of the comparison.

20. The system according to claim 19, wherein the reader is equipped with a light source, capable of delivering excitation light to cause said at least one long afterglow phosphorescent pigment of the security marking to emit said long afterglow luminescence light, wherein the software is capable, when running on the CPU unit of the reader, to execute a preliminary step of illuminating the security marking with excitation light by means of the light source of the reader.

21. The system according to claim 20, wherein said wavelength regions of the long afterglow luminescence light emitted by the security marking being at least partially in the visible range, said camera comprises a RGB diode, said light source is a white LED and wherein the camera is capable of detecting the long afterglow luminescence light in the first wavelength region on a first channel selected from R, G and B.

22. The system according to claim 21, wherein the camera is capable of detecting the long afterglow luminescence light in the second wavelength region on a second channel selected from R, G and B that is different from the first channel.

23. The system according to claim 22, wherein the camera is capable of detecting the long afterglow luminescence light in the third wavelength region on a third channel selected from R, G and B that is different from the first and second channels.

* * * * *